(12) United States Patent
De Ren et al.

(10) Patent No.: US 11,708,267 B2
(45) Date of Patent: Jul. 25, 2023

(54) PROCESS FOR MANAGING HYDROGEN SULFIDE IN A REFINERY

(71) Applicant: UOP LLC, Des Plaines, IL (US)

(72) Inventors: Jan De Ren, Bracknell (GB); Haiyan Wang, Hoffman Estates, IL (US); Joao Jorge Da Silva Ferreira Alves, Abu Dhabi (AE); Ian Clarke, Reading (GB); William J. Whyman, Collinsville, OK (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/547,969

(22) Filed: Dec. 10, 2021

(65) Prior Publication Data
US 2022/0194794 A1 Jun. 23, 2022

Related U.S. Application Data

(60) Provisional application No. 63/169,358, filed on Apr. 1, 2021, provisional application No. 63/127,610, filed on Dec. 18, 2020.

(51) Int. Cl.
*B01D 53/047* (2006.01)
*C01B 17/04* (2006.01)
(Continued)

(52) U.S. Cl.
CPC ........ *C01B 17/0408* (2013.01); *B01D 53/047* (2013.01); *C01B 17/501* (2013.01);
(Continued)

(58) Field of Classification Search
CPC .......... B01D 53/047; B01D 2251/2062; B01D 2251/602; B01D 2257/102;
(Continued)

(56) References Cited

U.S. PATENT DOCUMENTS 3,821,110 A * 6/1974 Luetzelschwab ....... C02F 1/586
  210/765
4,643,888 A * 2/1987 Palm ................... C01B 17/0439
  422/171

(Continued)

FOREIGN PATENT DOCUMENTS

CN 101955193 B 6/2012
CN 110028085 A 7/2019
(Continued)

OTHER PUBLICATIONS

"Search Report and Written Opinion for H220455-WO" dated Apr. 7, 2022.

*Primary Examiner* — Timothy C Vanoy
(74) *Attorney, Agent, or Firm* — Paschall & Associates, LLC; James C. Paschall

(57) ABSTRACT

A process and apparatus for managing hydrogen sulfide in a refinery is provided. In the process, a hydrogen sulfide stream from said refinery is fed to a sulfur recovery unit to produce sulfur and a sulfur compound stream or to a thermal oxidizer. The sulfur compound stream and the hydrogen sulfide stream are then thermally oxidized to produce a sulfur oxide stream. The sulfur oxide stream is then reacted with an ammonia stream. In aspect, the product of the reaction can be a fertilizer. The ammonia stream can be obtained from stripping the hydrogen sulfide stream.

25 Claims, 6 Drawing Sheets

(51) Int. Cl.
    *C01B 17/50* (2006.01)
    *C01B 21/02* (2006.01)
    *C01C 1/242* (2006.01)
(52) U.S. Cl.
    CPC ............. *C01B 21/02* (2013.01); *C01C 1/242* (2013.01); *B01D 2251/2062* (2013.01); *B01D 2251/602* (2013.01); *B01D 2257/102* (2013.01); *B01D 2257/302* (2013.01); *B01D 2258/0283* (2013.01)
(58) Field of Classification Search
    CPC ...... B01D 2257/302; B01D 2258/0283; C01B 17/0408; C01B 17/501; C01B 21/02
    See application file for complete search history.

(56) References Cited

U.S. PATENT DOCUMENTS

2016/0347625 A1* 12/2016 Dalary .................. C02F 1/04
2021/0331923 A1* 10/2021 Rajchel ................. C01B 17/64

FOREIGN PATENT DOCUMENTS

| EP | 0928774 B1 | 10/2003 | |
|---|---|---|---|
| SU | 1611851 A1 | 12/1990 | |
| WO | WO 01 030 691 A1 * | 5/2001 | ......... C01B 17/0413 |
| WO | 2006106289 A1 | 10/2006 | |

* cited by examiner

PROCESS FOR MANAGING HYDROGEN SULFIDE IN A REFINERY

CROSS-REFERENCE TO RELATED APPLICATIONS

This application claims priority from U.S. Provisional Application Nos. 63/127,610, filed Dec. 18, 2020, and 63/169,358 filed Apr. 1, 2021, which are incorporated herein in their entirety.

FIELD

The field is refining hydrocarbon streams and particularly hydroprocessing hydrocarbon streams.

BACKGROUND

Refineries can include any hydrocarbon processing facility that upgrades hydrocarbon streams into useable streams of greater value. Typically, refineries utilize one or more hydroprocessing units which convert hydrocarbons in the presence of hydroprocessing catalyst and hydrogen to more valuable products.

Hydrotreating is a hydroprocessing process used to remove heteroatoms such as sulfur and nitrogen from hydrocarbon streams, to partially or completely saturate a proportion of the aromatic compounds to meet fuel specifications and to saturate olefinic compounds to meet fuel specifications. Hydrotreating can be performed at high or low pressures but is typically operated at a lower pressure than for hydrocracking. Hydrogen sulfide is produced by hydrodesulfurization of organic sulfur in hydrocarbon feedstocks and ammonia is produced by hydrodenitrification of organic nitrogen which are both hydrotreating processes.

Hydrocracking is a hydroprocessing process in which not only some level of hydrotreating takes place but also where hydrocarbons crack in the presence of hydrogen and hydrocracking catalyst to lower molecular weight hydrocarbons. Depending on the desired output, a hydrocracking unit may contain one or more beds of the same or different catalyst. Slurry hydrocracking is a slurried catalytic process used to crack residue feeds to gas oils and fuels. Due to environmental concerns and newly enacted rules and regulations, saleable fuels must meet lower and lower limits on contaminates, such as sulfur and nitrogen. New regulations require essentially complete removal of sulfur from diesel. For example, the ultra-low sulfur diesel (ULSD) requirement is typically less than about 10 wppm sulfur.

Refineries produce hydrogen sulfide and ammonia in large quantities. In the liquid phase, some of the hydrogen sulfide and much of the ammonia collect in sour water streams taken from separator boots that allow aqueous streams to be separated from hydrocarbons streams which are both in liquid phase. Sour water can undergo stripping to concentrate hydrogen sulfide and ammonia in the gas phase while diluting their concentration in the liquid phase which typically is taken to the water treatment plant.

In the gas phase, hydrogen sulfide and some ammonia are scrubbed from hydrogen-rich streams by absorption into a solvent such as an amine in an acid gas scrubbing column. The solvent, rich in hydrogen sulfide, is regenerated by stripping it with steam to provide a scrubbed acid gas stream concentrated in hydrogen sulfide.

These two, waste hydrogen sulfide gas streams rich in hydrogen sulfide and ammonia to a lesser extent may be taken to a sulfur recovery unit (SRU) which typically operates to make elemental sulfur utilizing a two or three-stage Claus process, in some cases combined with an advanced Claus stage for increased sulfur recovery. Alternatively, to an advanced Claus stage, the two- or three-stage Claus process is followed by a clean-up unit. The clean-up unit hydrogenates remaining sulfur compounds to hydrogen sulfide which subsequently is absorbed in an amine solvent, followed by stripping to regenerate the solvent thereby selectively removing the absorbed hydrogen sulfide. The remaining sulfur compounds can then be recycled to the upstream SRU to be converted to sulfur to increase the overall sulfur recovery.

Sulfur and nitrogen are the essential components of fertilizer for crop production. There is a continuing need for improved methods for cleaning up refinery waste streams and an independent need for producing fertilizer.

BRIEF SUMMARY

A process and apparatus for managing hydrogen sulfide in a refinery is provided. In the process, a hydrogen sulfide stream from a refinery is thermally oxidized to produce a sulfur oxide stream. The sulfur oxide stream is then reacted with an ammonia stream. In aspect, the product of the reaction can be a fertilizer or other chemical. A hydrogen sulfide stream may be fed to a sulfur recovery unit to produce sulfur and a sulfur compound stream. The sulfur compound stream may be thermally oxidized to produce a sulfur oxide stream optionally with the hydrogen sulfide stream. The ammonia stream can be obtained from stripping of one or more sour water streams to provide the hydrogen sulfide stream.

DEFINITIONS

Figure 1:
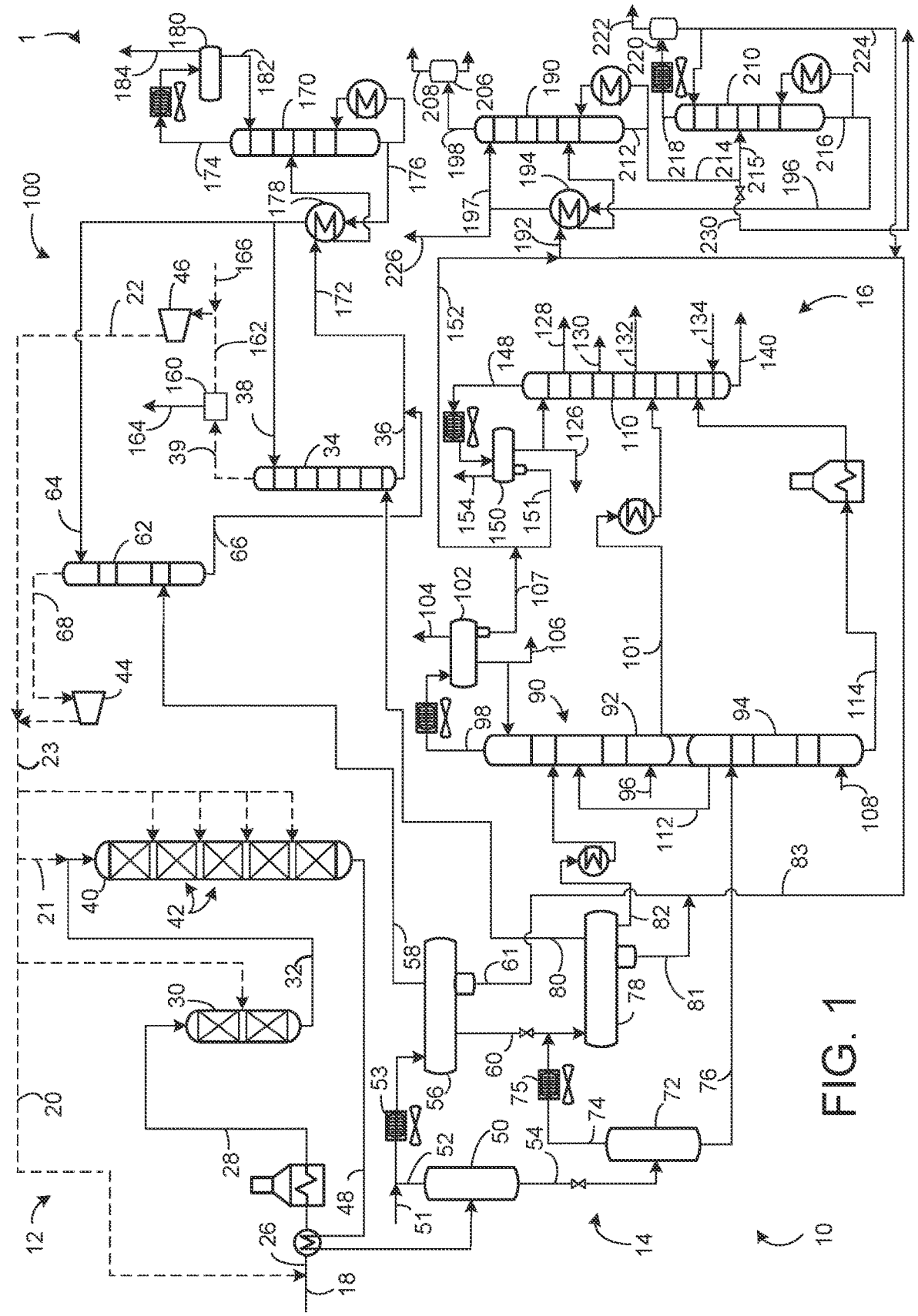
FIG. 1 is a process flow diagram of a refinery.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant", "predominantly" or "predominate" means greater than 50%, suitably greater than 75% and preferably greater than 90%.

As used herein, the term "refinery" means a facility for processing and upgrading hydrocarbon streams.

DETAILED DESCRIPTION

We have found that by separating ammonia from hydrogen sulfide in a waste stream, the remaining hydrogen sulfide in the stream can be thermally oxidized to sulfur oxides. Sulfur oxides can be reacted with ammonia to manage the sulfur oxides. In an embodiment, the reaction can produce ammonium sulfate or thiosulfate, a crop fertilizer. The ammonia can be taken from the waste stream, from elsewhere in the refinery or from an outside source. Hydrogen sulfide from a sour water stripper in a refinery will primarily be fed directly to a thermal oxidizer; whereas, a hydrogen sulfide from a solvent regeneration unit will primarily be fed to an SRU. The SRU tail gas will subsequently be fed to the thermal oxidizer for conversion to SOx. The SOx can be reacted with ammonia from the refinery or from elsewhere. The reaction may produce ammonium sulfate or ammonium thiosulfate.

A part of a refinery 1 is shown in FIG. 1. The refinery 1 comprises a hydroprocessing unit 10 for hydroprocessing hydrocarbons. The hydroprocessing unit 10 comprises a hydroprocessing reactor section 12, a separation section 14, a fractionation section 16 and a hydrogen recovery section 100. A hydrocarbonaceous stream in hydrocarbon line 18 and a hydrogen-rich stream in hydrogen line 20 are fed to the hydroprocessing reactor section 12. Hydroprocessed effluent is separated in the fractionation section 16.

Hydroprocessing that occurs in the hydroprocessing reactor section 12 may be hydrocracking or hydrotreating. Hydrocracking refers to a process in which hydrocarbons crack in the presence of hydrogen to lower molecular weight hydrocarbons. Hydrocracking is the preferred process in the hydroprocessing reactor section 12. Consequently, the term "hydroprocessing" will include the term "hydrocracking" herein. Hydrocracking also includes slurry hydrocracking in which resid feed is mixed with catalyst and hydrogen to make a slurry and cracked to lower boiling products.

Hydroprocessing that occurs in the hydroprocessing reactor section 12 may also be hydrotreating. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point of the hydrotreated product may also be reduced. The subject process and apparatus will be described with the hydroprocessing reactor section 12 comprising a hydrotreating reactor 30 and a hydrocracking reactor 40. It should be understood that a hydroprocessing reactor section 12 can comprise either or both the hydrotreating reactor 30 and the hydrocracking reactor 40.

In one aspect, the process and apparatus described herein are particularly useful for hydroprocessing a hydrocarbon feed stream comprising a hydrocarbonaceous feedstock. Illustrative hydrocarbonaceous feed stocks particularly for hydroprocessing units having a hydrocracking reactor include hydrocarbon streams having initial boiling points (IBP) above about 288° C. (550° F.), such as atmospheric gas oils, vacuum gas oil (VGO) having T5 and T95 between about 315° C. (600° F.) and about 650° C. (1200° F.), deasphalted oil, coker distillates, straight run distillates, pyrolysis-derived oils, high boiling synthetic oils, cycle oils, clarified slurry oils, deasphalted oil, shale oil, hydrocracked feeds, catalytic cracker distillates, atmospheric residue having an IBP at or above about 343° C. (650° F.) and vacuum residue having an IBP above about 510° C. (950° F.).

The hydrogen stream in the hydrogen line 20 may split off from a hydroprocessing hydrogen line 23. The hydrogen stream in line 20 may be a hydrotreating hydrogen stream. The hydrotreating hydrogen stream may join the hydrocarbonaceous stream in the hydrocarbon line 18 to provide a hydrocarbon feed stream in a hydrocarbon feed line 26. The hydrocarbon feed stream in the hydrocarbon feed line 26 may be heated by heat exchange with a hydrocracked stream in line 48 and in a fired heater. The heated hydrocarbon feed stream in line 28 may be fed to a hydrotreating reactor 30.

The hydrotreating reactor 30 may be a fixed bed reactor that comprises one or more vessels, single or multiple beds of catalyst in each vessel, and various combinations of hydrotreating catalyst in one or more vessels. It is contemplated that the hydrotreating reactor 30 be operated in a continuous liquid phase in which the volume of the liquid hydrocarbon feed is greater than the volume of the hydrogen gas. The hydrotreating reactor 30 may also be operated in a conventional continuous gas phase, a moving bed or a fluidized bed hydrotreating reactor. The hydrotreating reactor 30 may provide conversion per pass of about 10 to about 40 vol %.

The hydrotreating reactor 30 may comprise a guard bed of specialized material for pressure drop mitigation followed by one or more beds of higher quality hydrotreating catalyst. The guard bed filters particulates and picks up contaminants in the hydrocarbon feed stream such as metals like nickel, vanadium, silicon and arsenic which deactivate the catalyst. The guard bed may comprise material similar to the hydrotreating catalyst. Supplemental hydrogen may be added at an interstage location between catalyst beds in the hydrotreating reactor 30.

Suitable hydrotreating catalysts are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present description that more than one type of hydrotreating catalyst be used in the same hydrotreating reactor 30. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.8 MPa (gauge) (400 psig) to about 17.5 MPa (gauge) (2500 psig), a liquid hourly space velocity of the fresh hydrocarbonaceous feedstock from about 0.1 $hr^{-1}$, suitably 0.5 $hr^{-1}$, to about 5 $hr^{-1}$, preferably from about 1.5 to about 4 $hr^{-1}$, and a hydrogen rate of about 84 $Nm^3/m^3$ (500 scf/bbl), to about 1,011 $Nm^3/m^3$ oil (6,000 scf/bbl), preferably about 168 $Nm^3/m^3$ oil (1,000 scf/bbl) to about 1,250 $Nm^3/m^3$ oil (7,500 scf/bbl), with a hydrotreating catalyst or a combination of hydrotreating catalysts.

The hydrocarbon feed stream in the hydrocarbon feed line 28 may be hydrotreated with the hydrotreating hydrogen stream from hydrotreating hydrogen line 20 over the hydrotreating catalyst in the hydrotreating reactor 30 to provide a hydrotreated hydrocarbon stream that exits the hydrotreating reactor 30 in a hydrotreated effluent line 32. The hydrotreated effluent stream may be forwarded to the separation section 14 or be taken as a hydrocracking feed stream. The hydrogen gas laden with ammonia and hydrogen sulfide may be removed from the hydrocracking feed stream in a separator, but the hydrocracking feed stream is typically fed directly to the hydrocracking reactor 40 without separation. The hydrocracking feed stream may be mixed with a hydrocracking hydrogen stream in a hydrocracking hydrogen line 21 taken from the hydroprocessing hydrogen line 23 and be fed through an inlet to the hydrocracking reactor 40 to be hydrocracked.

Hydrocracking is a process in which hydrocarbons crack in the presence of hydrogen to lower molecular weight hydrocarbons. The hydrocracking reactor 40 may be a fixed bed reactor that comprises one or more vessels, single or multiple catalyst beds 42 in each vessel, and various combinations of hydrotreating catalyst and/or hydrocracking catalyst in one or more vessels. It is contemplated that the hydrocracking reactor 40 be operated in a continuous liquid phase in which the volume of the liquid hydrocarbon feed is greater than the volume of the hydrogen gas. The hydrocracking reactor 40 may also be operated in a conventional continuous gas phase, a moving bed or a fluidized bed hydroprocessing reactor. The term "hydroprocessing" will include the term "hydrocracking" herein.

The hydrocracking reactor 40 comprises a plurality of hydrocracking catalyst beds 42. If the hydrocracking reactor section 12 does not include a hydrotreating reactor 30, the catalyst beds 42 in the hydrocracking reactor 40 may include a hydrotreating catalyst for the purpose of saturating, demetallizing, desulfurizing or denitrogenating the hydrocarbon feed stream before it is hydrocracked with the hydrocracking catalyst in subsequent vessels or catalyst beds 42 in the hydrocracking reactor 40.

The hydrotreated hydrocarbon feed stream is hydroprocessed over a hydroprocessing catalyst in a hydroprocessing reactor in the presence of a hydrocracking hydrogen stream from a hydrocracking hydrogen line 21 to provide a hydroprocessed effluent stream. Specifically, the hydrotreated hydrocarbon feed stream is hydrocracked over a hydrocracking catalyst in the hydrocracking reactor 40 in the presence of the hydrocracking hydrogen stream from a hydrocracking hydrogen line 21 to provide a hydrocracked effluent stream. A hydrogen manifold may deliver supplemental hydrogen streams to one, some or each of the catalyst beds 42. In an aspect, the supplemental hydrogen is added to each of the hydrocracking catalyst beds 42 at an interstage location between adjacent beds, so supplemental hydrogen is mixed with hydroprocessed effluent exiting from the upstream catalyst bed 42 before entering the downstream catalyst bed 42.

The hydrocracking reactor may provide a total conversion of at least about 20 vol % and typically greater than about 60 vol % of the hydrotreated hydrocarbon stream in the hydrotreated effluent line 32 to products boiling below the cut point of the heaviest desired product which is typically diesel. The hydrocracking reactor 40 may operate at partial conversion of more than about 30 vol % or full conversion of at least about 90 vol % of the feed based on total conversion. The hydrocracking reactor 40 may be operated at mild hydrocracking conditions which will provide about 20 to about 60 vol %, preferably about 20 to about 50 vol %, total conversion of the hydrocarbon feed stream to product boiling below the diesel cut point.

The hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the hydrocracking reactor 40 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms, wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of the noble metals, it is normally preferred to use about 0.05 to about 2 wt % noble metal.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., about 371° C. (700° F.) to about 648° C. (1224° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,178.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to less than about 2.5 $hr^{-1}$ and a hydrogen rate of about 421 $Nm^3/m^3$ (2,500 scf/bbl) to about 2,527 $Nm^3/m^3$ oil (15,000 scf/bbl). If mild hydrocracking is desired, conditions may include a temperature from about 35° C. (600° F.) to about 441° C. (825° F.), a pressure from about 5.5 MPa (gauge) (800 psig) to about 3.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

The hydroprocessed effluent stream may exit the hydrocracking reactor 40 in the hydrocracked effluent line 48 and be separated in the separation section 14 in downstream communication with the hydroprocessing reactor comprising the hydrotreating reactor 30 and/or the hydrocracking reactor 40. The separation section 14 comprises one or more separators in downstream communication with the hydroprocessing reactor comprising the hydrotreating reactor 30 and/or the hydrocracking reactor 40. The hydrocracked effluent stream in the hydrocracked line 48 may in an aspect be heat exchanged with the hydrocarbon feed stream in the hydrocarbon feed line 26 and be delivered to a hot separator 50.

The hot separator 50 separates the hydroprocessed effluent stream to provide a hydrocarbonaceous, hot vapor stream in a hot overhead line 52 extending from a top of the hot separator 50 and a hydrocarbonaceous, hot liquid stream in a hot bottoms line 54 extending from a bottom of the hot separator 50. The hot separator 50 may be in downstream communication with the hydroprocessing reactor comprising the hydrotreating reactor 30 and/or the hydrocracking reactor 40. The hot separator 50 operates at about 77° C. (350° F.) to about 371° C. (700° F.) and preferably operates at about 232° C. (450° F.) to about 315° C. (600° F.). The hot separator 50 may be operated at a slightly lower pressure than the hydrocracking reactor 40 accounting for pressure drop through intervening equipment. The hot separator 50 may be operated at pressures between about 3.4 MPa (gauge) (493 psig) and about 20.4 MPa (gauge) (2960 psig). The hydrocarbonaceous, hot vapor stream taken in the hot overhead line 52 may have a temperature of the operating temperature of the hot separator 50.

The hot vapor stream in the hot overhead line 52 may be cooled with an air cooler 53 before entering a cold separator 56. As a consequence of the reactions taking place in the hydrocracking reactor 40 wherein nitrogen, chlorine and sulfur are reacted from the hydrocarbons in the feed, ammonia, hydrogen sulfide and hydrogen chloride are formed. At a characteristic sublimation temperature, ammonia and hydrogen sulfide will combine to form ammonium bisulfide, and ammonia and hydrogen chloride will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the hot overhead line 52 transporting the hot vapor stream, a suitable amount of wash water may be introduced into the hot overhead line 52 upstream of the air cooler 53 by water line 51 at a point in the hot overhead line where the temperature is above the characteristic sublimation temperature of these compounds.

The hot vapor stream may be separated in the cold separator 56 to provide a cold vapor stream comprising a hydrogen-rich gas stream in a cold overhead line 58 extending from a top of the cold separator 56 and a cold liquid stream in a cold bottoms line 60 extending from a bottom of the cold separator 56. The cold separator 56 serves to separate hydrogen rich gas from hydrocarbon liquid in the hydroprocessed stream for recycle to the reactor section 12 in the cold overhead line 58. The cold separator 56, therefore, is in downstream communication with the hot overhead line 52 of the hot separator 50 and the hydroprocessing reactor comprising the hydrotreating reactor 30 and/or the hydrocracking reactor 40. The cold separator 56 may be operated at about 100° F. (38° C.) to about 150° F. (66° C.), suitably about 115° F. (46° C.) to about 145° F. (63° C.), and just below the pressure of the hydroprocessing reactor comprising the hydrotreating reactor 30 and/or the hydrocracking reactor 40 and the hot separator 50 accounting for pressure drop through intervening equipment to keep hydrogen and light gases in the overhead and normally liquid hydrocarbons in the bottoms. The cold separator 56 may be operated at pressures between about 3 MPa (gauge) (435 psig) and about 20 MPa (gauge) (2,900 psig). The cold separator 56 may also have a boot for collecting a sour water stream in line 61 comprising the salts previously mentioned and aqueous hydrogen sulfide and ammonia. The cold liquid stream in the cold bottoms line 60 may have a temperature of the operating temperature of the cold separator 56.

The cold vapor stream in the cold overhead line 58 is rich in hydrogen but includes hydrogen sulfide and ammonia. Thus, hydrogen can be recovered from the cold vapor stream if these gases are removed. The cold vapor stream in the cold overhead line 58 may be passed through a trayed or packed recycle scrubbing column 62 where it is scrubbed by means of a recycle solvent liquid such as an aqueous solution fed by a recycle solvent line 64 to remove acid gases including hydrogen sulfide by extracting them into the aqueous solution. Preferred recycle solvent liquids include Selexol available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean amine contacts the cold vapor stream and absorbs acid gas contaminants such as hydrogen sulfide and carbon dioxide. The resultant "sweetened" cold vapor stream is taken out from an overhead outlet of the recycle scrubber column 62 in a recycle scrubber overhead line 68, and a rich solvent stream comprising acid gases is taken out from the bottoms at a bottom outlet of the recycle scrubber column in a recycle scrubber bottoms line 66. The rich recycle solvent stream from the recycle scrubber bottoms may be forwarded to the solvent regenerator 170 to be regenerated and recycled back to the recycle scrubbing column 62 in the recycle solvent line 64. The scrubbed hydrogen-rich stream emerges from the scrubber via the recycle scrubber overhead line 68 and may be compressed in a recycle compressor 44. The scrubbed hydrogen-rich stream in the scrubber overhead line 68 may be supplemented with make-up hydrogen stream in the make-up line 22 upstream or downstream of the compressor 44. The compressed hydrogen stream supplies hydrogen to the hydrogen stream in the hydrogen line 23. The recycle scrubbing column 62 may be operated with a gas inlet temperature between about 38° C. (100° F.) and about 66° C. (150° F.) and an overhead pressure of about 3 MPa (gauge) (435 psig) to about 20 MPa (gauge) (2900 psig). The recycle scrubbing column 62 may be operated at a temperature of about 40° C. (104° F.) to about 125° C. (257° F.) and a pressure of about 1200 to about 1600 kPa. The temperature of the hot vapor stream to the recycle scrubbing column 62 may be between about 20° C. (68° F.) and about 80° C. (176° F.) and the temperature of the scrubbing extraction liquid stream in the solvent line 64 may be between about 20° C. (68° F.) and about 70° C. (158° F.).

The hydrocarbonaceous hot liquid stream in the hot bottoms line 54 comprises a substantial hydrogen concentration. The hot liquid stream may be let down in pressure fed to a hot flash drum 72 to provide a hot flash vapor stream of light ends and hydrogen in a hot flash overhead line 74 extending from a top of the hot flash drum 72 and a hot flash liquid stream in a hot flash bottoms line 76 extending from a bottom of the hot flash drum. In an aspect, light gases such as hydrogen sulfide may be stripped from the hot flash liquid stream in the hot flash bottoms line 76. Accordingly, a product stripping column 90 may be in direct, downstream communication with the hot flash drum 72 and the hot flash bottoms line 76.

The hot flash drum 72 may be operated at the same temperature as the hot separator 50 but at a lower pressure of between about 1.4 MPa (gauge) (200 psig) and about 6.9 MPa (gauge) (1000 psig), suitably no more than about 3.8 MPa (gauge) (550 psig). The hot flash liquid stream taken in the hot flash bottoms line 76 may have a temperature of the operating temperature of the hot flash drum 72.

In an aspect, the cold liquid stream in the cold bottoms line 60 may be let down in pressure and flashed in a cold flash drum 78 to separate the cold liquid stream in the cold bottoms line 60. The cold flash drum 78 may be in direct, downstream communication with the cold bottoms line 60 of the cold separator 56 and in downstream communication with the hydroprocessing reactor comprising the hydrotreating reactor 30 and/or the hydrocracking reactor 40. The cold flash drum 78 may separate the cold liquid stream in the cold bottoms line 60 to provide a cold flash vapor stream in a cold flash overhead line 80 extending from a top of the cold flash drum 78 and a cold flash liquid stream in a cold flash bottoms line 82 extending from a bottom of the cold flash drum. In an aspect, light gases such as hydrogen sulfide may be stripped from the cold flash liquid stream in the cold flash bottoms line 82. Accordingly, a product stripping column 90 may be in downstream communication with the cold flash drum 78 and the cold flash bottoms line 82.

The cold flash drum 78 may be in downstream communication with the cold bottoms line 60 of the cold separator 56 and the hydroprocessing reactor comprising the hydrotreating reactor 30 and/or the hydrocracking reactor 40. The cold flash drum 78 may be operated at the same temperature as the cold separator 56 but typically at a lower pressure of between about 1.4 MPa (gauge) (200 psig) and about 6.9 MPa (gauge) (1000 psig) and preferably between about 2.4 MPa (gauge) (350 psig) and about 3.8 MPa (gauge) (550 psig). A flashed aqueous stream may be removed in a cold flash aqueous line 81 from a boot in the cold flash drum 78 comprising hydrogen sulfide and ammonia. The cold flash liquid stream in the cold flash bottoms line 82 may have the same temperature as the operating temperature of the cold flash drum 78. The cold flash vapor stream in the cold flash overhead line 80 contains substantial hydrogen that may be recovered.

In an embodiment, the hot flash vapor stream may be cooled in the cooler 75 and fed to the cold flash drum 78 to be flashed with the cold liquid stream in the cold bottoms line 60. In an aspect, the cold bottoms line 60 may be joined by the hot flash overhead line 74 and receive the cooled hot flash vapor stream in which the cold bottoms line 60 delivers both streams, the cooled, hot flash vapor stream and the cold liquid stream, to the cold flash drum 78. In this embodiment, the cold flash drum 78 may be in downstream communication with the hot flash overhead line 74 of the hot flash stripper 72.

The cold flash vapor stream in the cold flash overhead line 80 is rich in hydrogen which may be recovered in a hydrogen recovery section 100. The cold flash vapor stream comprises hydrogen from the hot flash vapor stream in the hot flash overhead line 74. The cold flash vapor stream in the cold flash overhead line 80 may be passed through the trayed or packed cold gas scrubbing column 34. The cold gas scrubbing column 34 may be in downstream communication with the hot flash overhead line 74 and the cold flash overhead line 80. The cold flash vapor stream in the cold flash overhead line 80 may be fed to a lower portion of the cold gas scrubbing column 34. The cold flash vapor stream is scrubbed by means of a cold solvent liquid stream such as an aqueous solution fed by a cold solvent line 38 to remove acid gases including hydrogen sulfide and carbon dioxide by extracting them into the aqueous solution. Preferred extraction liquids include Selexol available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean cold solvent contacts the cold vapor stream and absorbs acid gas contaminants such as hydrogen sulfide. The resultant "sweetened" scrubbed vapor stream is taken out from an overhead outlet of the cold gas scrubbing column 34 in a scrubber overhead line 39, and a rich off-gas solvent stream rich in acid gas is taken out from the bottoms at a bottom outlet of the cold gas scrubbing column 34 in an off-gas scrubber bottoms line 36. The rich scrubbing cold solvent from the bottoms may be regenerated in a solvent regenerator column 170 and recycled back to the cold scrubbing column 34 in the off-gas solvent line 38.

The scrubbed hydrogen-rich vapor stream emerges from the cold gas scrubber column 170 via the cold scrubber overhead line 39 and may be routed to a pressure swing adsorption (PSA) unit 160 to yield a high purity hydrogen rich stream 162 and a tail gas stream in line 164. The tail gas stream in line 164 may be taken at lower pressure to ensure greater recovery of hydrogen in the high purity hydrogen rich stream 162. The high purity hydrogen stream 162 may combine with additional hydrogen rich makeup gas 166 and may be compressed in a make-up compressor 46. The low hydrogen purity stream 164 comprises the majority of the non-hydrogen compounds in the scrubbed hydrogen-rich vapor stream in the scrubber overhead line 39. The low hydrogen purity tail gas stream 164 may be routed to a thermal oxidizer 320 in the sulfur utilization section 300 of FIG. 2 to be described hereinafter. The compressed stream from the make-up compressor 46 may provide make-up hydrogen gas in line 22 to the hydroprocessing reactor section 12. The cold gas scrubbing column 34 may be operated at a temperature of about 40° C. (104° F.) to about 125° C. (257° F.) and a pressure of about 1200 to about 1700 kPa. The temperature of the cold flash overhead stream 80 to the cold gas scrubbing column 34 may be between about 20° C. (68° F.) and about 80° C. (176° F.) and the temperature of the cold solvent liquid stream in the cold solvent line 38 may be between about 25° C. (77° F.) and about 75° C. (185° F.).

The fractionation section 16 may include the stripping column 90 and a fractionation column 110. The stripping column 90 may be in downstream communication with a separator 50, 72, 56, 78 or a bottoms line in the separation section 14 for stripping volatiles from a hydrocracked stream. For example, the stripping column 90 may be in downstream communication with the hot bottoms line 54, the hot flash bottoms line 76, the cold bottoms line 60 and/or the cold flash bottoms line 82. In an aspect, the stripping column 90 may be a vessel that contains a cold stripping column 92 and a hot stripping column 94 with a wall that isolates each of the stripping columns from the other. The cold stripping column 92 may be in downstream communication with the hydroprocessing reactor comprising the hydrotreating reactor 30 and/or the hydrocracking reactor 40, the cold bottoms line 60 and, in an aspect, the cold flash bottoms line 82 for stripping the cold liquid stream. The hot stripping column 94 may be in downstream communication with the hydroprocessing reactor section 12 comprising the hydrotreating reactor 30 and/or the hydrocracking reactor 40 and the hot bottoms line 54 and, in an aspect, the hot flash bottoms line 76 for stripping a hot liquid stream which is hotter than the cold liquid stream. The hot liquid stream may be hotter than the cold liquid stream, by at least 25° C. and preferably at least 50° C.

The cold flash liquid stream comprising the hydrocracked stream in the cold flash bottoms line 82 may be heated and fed to the cold stripping column 92 at an inlet which may be in a top half of the column. The cold flash liquid stream which comprises the hydrocracked stream may be stripped of gases in the cold stripping column 92 with a cold stripping media which is an inert gas such as steam from a cold stripping media line 96 to provide a cold stripper vapor stream of naphtha, hydrogen, hydrogen sulfide, steam and other gases in a cold stripper overhead line 98 and a liquid cold stripped stream in a cold stripper bottoms line 101. The cold stripper vapor stream in the cold stripper overhead line 98 may be condensed and separated in a receiver 102. An overhead line 104 from the receiver 102 carries a net stripper off gas stream of LPG, light hydrocarbons, hydrogen sulfide and hydrogen.

Unstabilized liquid naphtha from the bottoms of the receiver 102 may be split between a reflux portion refluxed to the top of the cold stripping column 92 and a liquid stripper overhead stream which may be transported in a condensed stripper overhead line 106 to further recovery or processing. A stripper sour water stream may be collected from a boot of the overhead receiver 102 in a stripper sour water line 107.

The cold stripping column 92 may be operated with a bottoms temperature between about 150° C. (300° F.) and about 288° C. (550° F.), preferably no more than about 260° C. (500° F.), and an overhead pressure of about 0.7 MPa (gauge) (100 psig), preferably no less than about 0.34 MPa (gauge) (50 psig), to no more than about 2.0 MPa (gauge) (290 psig). The temperature in the overhead receiver 102 ranges from about 38° C. (100° F.) to about 66° C. (150° F.) and the pressure is essentially the same as in the overhead of the cold stripping column 92.

The cold stripped stream in the cold stripper bottoms line 101 may comprise predominantly naphtha and kerosene boiling materials. The cold stripped stream in line 101 may be heated and fed to the product fractionation column 110. The product fractionation column 110 may be in downstream communication with the hydroprocessing reactor section 12 comprising the hydrotreating reactor 30 and/or the hydrocracking reactor 40, the cold stripper bottoms line 101 of the cold stripping column 92 and the stripping column 90. The product fractionation column 110 may be in downstream communication with one, some or all of the hot separator 50, the cold separator 56, the hot flash drum 72 and the cold flash drum 78.

The hot flash liquid stream comprising a hydroprocessed stream in the hot flash bottoms line 76 may be fed to the hot stripping column 94 near a top thereof. The hot flash liquid stream may be stripped in the hot stripping column 94 of gases with a hot stripping media which is an inert gas such as steam from a line 108 to provide a hot stripper overhead stream of naphtha, hydrogen, hydrogen sulfide, steam and other gases in a hot stripper overhead line 112 and a liquid hot stripped stream in a hot stripper bottoms line 114. The hot stripper overhead line 112 may be condensed and a portion refluxed to the hot stripping column 92. However, in an embodiment, the hot stripper overhead stream in the hot stripper overhead line 112 from the overhead of the hot stripping column 94 may be fed into the cold stripping column 92 directly in an aspect without condensing or refluxing. The inlet for the cold flash bottoms line 82 carrying the cold flash liquid stream may be at a higher elevation than the inlet for the hot stripper overhead line 112. The hot stripping column 94 may be operated with a bottoms temperature between about 160° C. (320° F.) and about 360° C. (680° F.) and an overhead pressure of about 0.7 MPa (gauge) (100 psig), preferably no less than about 0.34 MPa (gauge) (50 psig), to no more than about 2.0 MPa (gauge) (290 psig).

At least a portion of the hot stripped stream comprising a hydroprocessed effluent stream in the hot stripped bottoms line 114 may be heated and fed to the product fractionation column 110. The product fractionation column 110 may be in downstream communication with the hot stripped bottoms line 114 of the hot stripping column 94. The hot stripped stream in line 114 may be at a hotter temperature than the cold stripped stream in the cold stripped bottoms line 101.

The product fractionation column 110 may be in downstream communication with the hot stripping column 94 and may comprise more than one fractionation column for separating stripped hydroprocessed streams into product streams. The product fractionation column 110 may also be in downstream communication with the hot separator 50, the cold separator 56, the hot flash drum 72, and the cold flash drum 78. The product fractionation column 110 may fractionate hydrocracked streams, the cold stripped stream, and the hot stripped stream by means of an inert stripping gas stream fed from stripping line 134. The product streams from the product fractionation column 110 may include a net fractionated overhead stream comprising naphtha in a net overhead line 126, an optional heavy naphtha stream in line 128 from a side cut outlet, a kerosene stream carried in line 130 from a side cut outlet and a diesel stream in diesel line 132 from a side outlet.

An unconverted oil (UCO) stream boiling above the diesel cut point may be taken in a fractionator bottoms line 140 from a bottom of the product fractionation column 110. A portion or all of the UCO stream in the fractionator bottoms line 140 may be purged from the process, recycled to the hydrocracking reactor 40 or forwarded to a second stage hydrocracking reactor (not shown).

Product streams may also be stripped to remove light materials to meet product purity requirements. A fractionated overhead stream in an overhead line 148 may be condensed and separated in a receiver 150 with a portion of the condensed liquid being refluxed back to the product fractionation column 110. A fractionated overhead sour water stream may be taken in line 151. The net fractionated overhead stream in line 126 may be further processed or recovered as naphtha product. The product fractionation column 110 may be operated with a bottoms temperature between about 260° C. (500° F.) and about 385° C. (725° F.), preferably at no more than about 380° C. (715° F.), and at an overhead pressure between about 7 kPa (gauge) (1 psig) and about 69 kPa (gauge) (10 psig). A portion of the UCO stream in the fractionator bottoms line 140 may be reboiled and returned to the product fractionation column 110 instead of adding an inert stripping media stream such as steam in line 134 to heat to the product fractionation column 110. An overhead line 154 from the receiver 150 carries a net fractionator off gas of LPG and light hydrocarbons.

The cold gas solvent stream in line 36 and the rich recycle solvent stream in line 66 may be combined in a common rich solvent stream in a common rich solvent line 172 to be delivered to a common solvent regenerator column 170. The rich solvent streams are rich in acid gases and must be stripped of acid gases. Other acid gases from the refinery 1 may also be combined in the common rich solvent line 172. The common rich solvent stream in line 172 is heat exchanged with a common lean solvent stream in line 176 in a solvent regenerator heat exchanger 178. The heated common rich solvent stream in line 172 is fed to the common solvent regenerator 170 in which it is stripped by reboiling to produce the lean solvent stream in line 176. The lean solvent stream in line 176 is cooled by heat exchange with the common rich solvent in line 172 and split between the recycle solvent in line 64 and the cold gas solvent in line 38. An overhead acid gas stream is produced in an overhead line 174 which is cooled and separated in a solvent regenerator overhead receiver 180. A liquid reflux stream in a bottoms line 182 is refluxed back to the solvent regenerator column 170 and a solvent gaseous hydrogen sulfide stream concentrated in hydrogen sulfide is taken in line 184. The solvent gaseous hydrogen sulfide stream 184 is dilute in ammonia with less than 1 wt % ammonia and is transported to a sulfur recovery unit (SRU) 310 and/or a thermal oxidizer 320 of the sulfur utilization section 300 in FIG. 2. The solvent regenerator column 170 may be operated with a bottoms temperature between about 250° C. (482° F.) and about 385° C. (725° F.), and at an overhead pressure between about 7 kPa (gauge) (1 psig) and about 69 kPa (gauge) (10 psig).

The cold separator sour water stream in line 61 from the cold separator 56 and the cold flash sour water stream in line 81 from the cold flash drum may be combined in line 83. An ammonia stripper overhead liquid stream in line 224 may also be combined in line 83. The stripper sour water stream in line 107 from the stripper receiver 102 and fractionator sour water stream in line 151 from the fractionator receiver 150 may be combined in line 152. The sour water streams in line 83 and 152 and any more in the refinery may be delivered to the sour water stripper column 190. In an embodiment, all of the sour water streams in lines 83 and 152 and any other sour water streams in the refinery 1 are combined in a combined sour water stream in line 192. The combined sour water stream 192 may include the cold separator sour water stream in line 61 from the cold separator 56, the cold flash sour water stream in line 81 from the cold flash drum 78, the stripper sour water stream line 107 from the stripper receiver 102, fractionator sour water stream in line 151 from the fractionator receiver 150, an ammonia stripper overhead liquid stream in line 224 and any more in the refinery may be delivered to the sour water stripper column 190 in a combined sour water line 192. The combined sour water stream may be cooled, degassed, deoiled and filtered before it is passed to a heat exchanger

194 which heats the combined sour water stream in line 192 and cools an ammonia stripper bottoms stream 196. The heated, combined sour water stream 192 is then sent to the sour water stripper column 190.

The sour water stripper column 190 contains trays or packing that the heated combined sour water stream 192 flows through and around to separate hydrogen sulfide from the heated combined sour water stream 192. A cooled reflux water stream in line 197 which may be a cooled ammonia stripper bottoms stream may be fed to the top of the sour water stripper column 190 to remove heat and suppress evolution of gaseous ammonia in the sour water stripper column. A reboiler acts as a heat exchanger to provide the energy required to provide heat to the column and strip hydrogen sulfide from the combined sour water stream. The resulting sour water stripper overhead stream 198 may be sent to a sour water receiver 206 to substantially remove any entrained droplets and produce a sour gaseous hydrogen sulfide stream in line 208. The sour gaseous hydrogen sulfide stream 208 is dilute in ammonia with less than 2 wt % ammonia and is transported to a sulfur recovery unit (SRU) 310 and/or a thermal oxidizer 320 of the sulfur utilization section 300 in FIG. 2. The sour gaseous hydrogen sulfide stream may contain a very little hydrocarbons since the combined sour water feed in line 192 has been degassed and deoiled. The sour water stripper column 190 may operate at a bottoms temperature of about 150° C. (302° F.) to about 200° C. (392° F.) and an overhead pressure of about 690 kPa (100 psig) to about 1241 kPa (180 psig). A hydrogen sulfide lean stream in a sour water stripper bottoms line 212 contains ammonia and a small concentration of hydrogen sulfide. A portion of the hydrogen sulfide lean stream in line 212 may be reboiled and returned to the sour water stripper column 190 while a net hydrogen sulfide lean stream in line 214 may be sent directly to an ammonia stripper column 210 in line 215.

Figure 4:
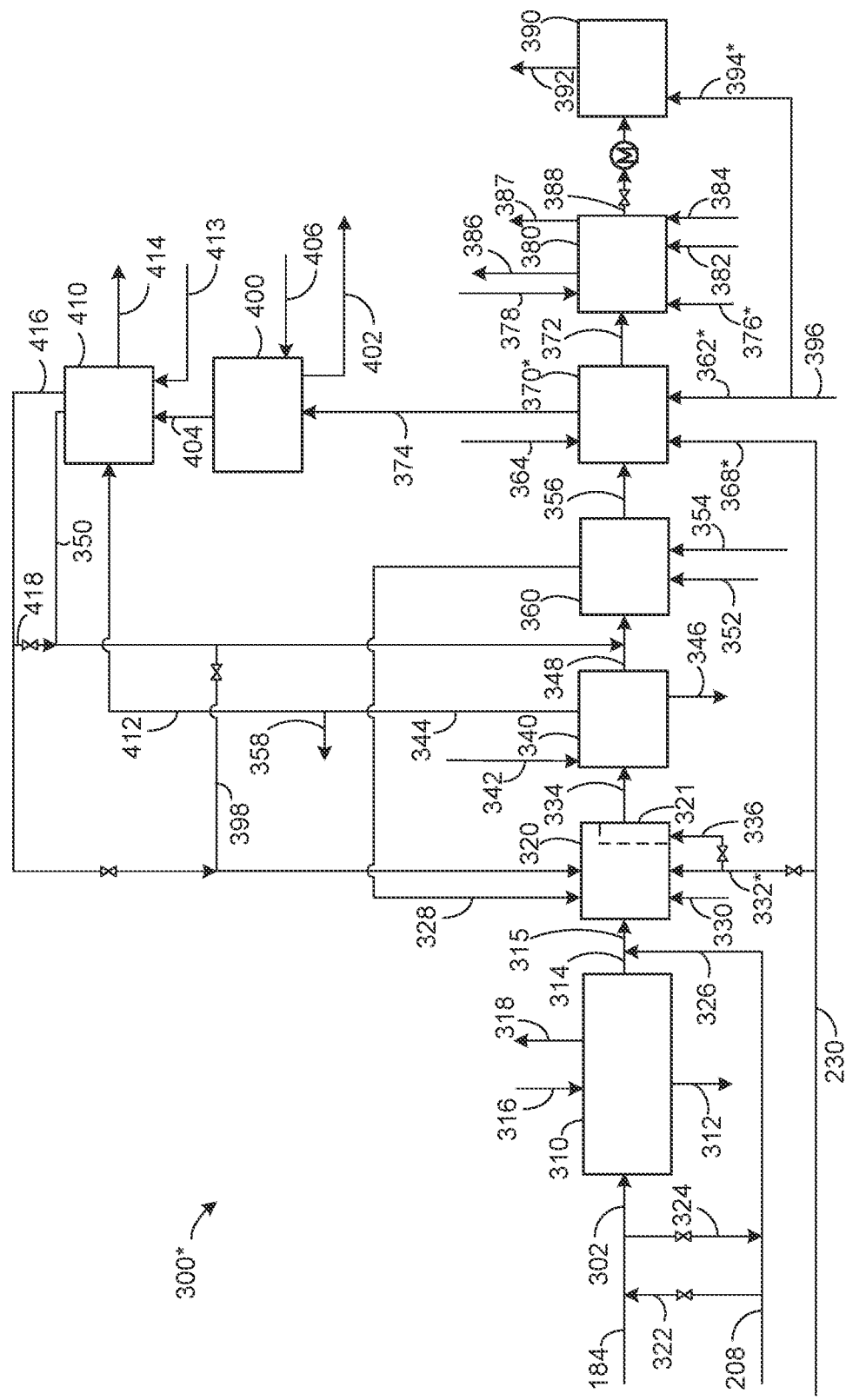
FIG. 4 is an additional alternative process flow diagram of FIG. 2.

Alternatively, all or a portion of the hydrogen sulfide lean stream in line 214 may be taken in line 230 through a control valve thereon to provide ammonia requirements in the sulfur utilization section 300* in FIG. 4. In this embodiment, the ammonia stripper column 210 may be omitted.

The ammonia stripper column 210 may be a steam re-boiled, refluxed distillation column. In the ammonia stripper column 210, essentially all ammonia and any remaining hydrogen sulfide are removed from the ammonia stripper bottoms stream, which leaves the ammonia stripper column 210 in an ammonia stripper bottoms line 216. A portion of the ammonia stripper bottoms stream in line 216 is taken in the ammonia stripper bottoms stream in line 196 to the heat exchanger 194 to heat the combined sour water stream in line 192 and cool the ammonia stripper bottoms stream in line 196 The heated ammonia stripper bottoms stream in line 196 may provide the cooled reflux water stream in line 197 and a stripped water stream in line 226. The stripped water stream in line 226 is suitable for many reuses in the refinery 1 such as in the hydroprocessing unit 12, the sulfur utilization unit 300 of FIG. 2 or in a crude desalter or it may be discharged after treatment in a water treatment plant (not shown). The containment levels of hydrogen sulfide and ammonia in the stripped water stream in line 226 may be tailored to individual requirements and are typically about 1 to about 100 ppmw ammonia and about 1 to about 25 ppmw hydrogen sulfide.

In the ammonia stripper column 210, essentially all ammonia and any remaining hydrogen sulfide are removed from the sour water stripper bottoms stream in the stripper feed line 215, which leaves the ammonia stripper column 210 as an ammonia stripper overhead stream in line 218. The ammonia stripper overheads stream 218 is cooled and sent to an ammonia stripper overhead receiver 220 which separates an ammonia vapor off-gas stream in line 222 from an ammonia stripper overhead liquid stream. A portion of the ammonia stripper overhead liquid stream is returned as reflux to the ammonia stripper column 210 and another portion of the ammonia liquid overhead stream in line 224 may be taken for other uses such as diluting the combined sour water stream in line 192 optionally via line 83. A reboiler heats another portion of the ammonia stripper bottoms stream in bottoms line 216 to provide the heat required to remove ammonia and any remaining hydrogen sulfide from the sour water stripper bottoms stream in line 212. The sour water stripper 190 may operate at a bottoms temperature of about 100° C. (212° F.) to about 150° C. (302° F.) and an overhead pressure of about 69 kPa (10 psig) to about 207 kPa (30 psig). The ammonia vapor off-gas stream in line 222 is an ammonia-rich gas which is transported to the ammonia scrubber section 370 and/or the NOx reduction section 390 of the sulfur utilization unit of FIG. 2.

Figure 2:
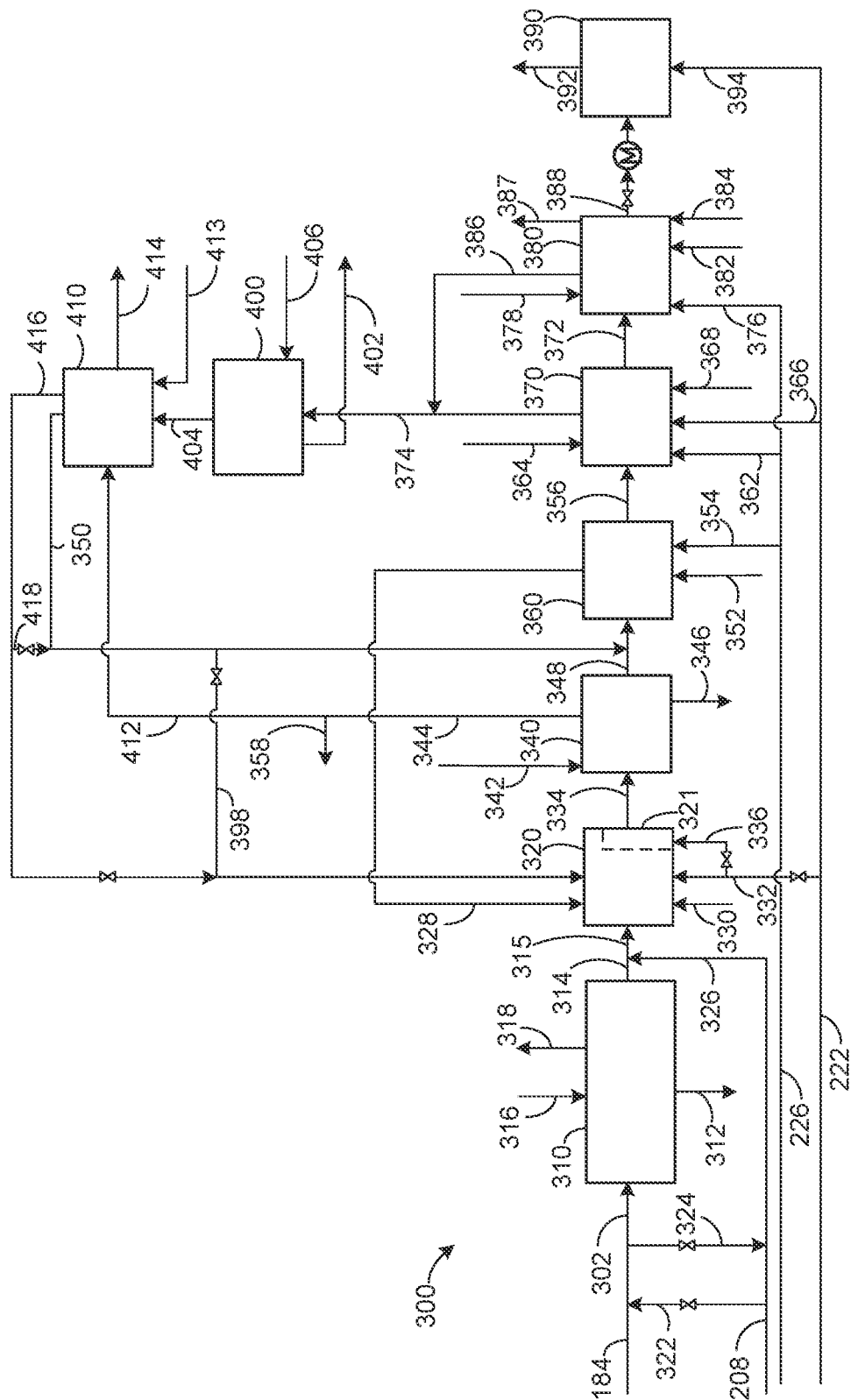
FIG. 2 is a process flow diagram of a sulfur utilization unit in communication with the refinery of FIG. 1.

FIG. 2 depicts the sulfur utilization section 300 for processing a hydrogen sulfide stream from the refinery 1 in FIG. 1. The sulfur utilization section comprises a sulfur recovery unit (SRU) 310, a thermal oxidizer 320, an optional waste heat recovery section 340, a quench section 360, an ammonia scrubber section 370, an alkaline scrubber section 380, a NOx reduction section 390, which may include a catalytic VOC combustion section, a water removal section 400 and a dryer 410. A gaseous hydrogen sulfide recovery feed stream in line 302 is fed to the SRU 310. The gaseous hydrogen sulfide recovery feed stream in line 302 may be considered a second hydrogen sulfide stream. The hydrogen sulfide stream is preferably taken from the solvent gaseous hydrogen sulfide stream in the solvent regenerator overhead line 184 taken from the solvent regeneration column 170. The hydrogen sulfide stream may be taken in whole or in part from the sour gaseous hydrogen sulfide stream from the sour water stripper overhead line 208 taken from the sour water stripper column 190. A part of the sour gaseous hydrogen sulfide stream in line 208 may be diverted by a sour gaseous hydrogen sulfide bypass line 322 to the hydrogen sulfide recovery feed stream in line 302 and delivered to a sulfur recovery unit (SRU) 310.

The SRU 310 may operate a process that converts hydrogen sulfide to elemental sulfur. A Claus unit is suitable although a liquid redox sulfur unit, or biological process unit may also be used. The Claus unit combusts hydrogen sulfide to produce elemental sulfur and sulfur dioxide in a combustor at a temperature of about 950° C. to about 1540° C., preferably no more than 1300° C. The combustion effluent is cooled in a boiler to produce high pressure steam. Boiler feed water is provided in line 316 and steam is discharged in line 318. Liquid sulfur will be condensed from the cooled combustion effluent at a temperature ranging from about 310° F. (154° C.) to about 350° F. (176° C.). The remaining gas containing a lower concentration of sulfur will be reheated to a temperature of about 400° F. (204° C.) to about 600° F. (332° C.) to generate more elemental sulfur gas ranging from two to eight sulfur atoms per molecule. The elemental sulfur gas is subsequently condensed by cooling the gas to about 300° F. (149° C.) to about 350° F. (176° C.) and recovering condensed sulfur.

In an embodiment, the uncondensed flue gas may exit from a condenser in the SRU 310 in the sulfur compounds stream in line 314 in route to the thermal oxidizer 320. The uncondensed flue gas bypasses the catalytic reactor without undergoing catalytic conversion of sulfur oxide and hydrogen sulfide to elemental sulfur. The uncondensed flue gas from the condenser may be directly routed to the thermal oxidizer 320 as a residual sulfur compounds stream in line 314 and the elemental sulfur may exit from the condenser in the sulfur removal unit 310 as a condensed sulfur product in line 312.

Alternatively, the uncondensed flue gas from the condenser may continue in the sulfur removal unit 310 by being reheated to a temperature of about 200° C. (392° F.) to about 310° C. (590° F.) and contacted with a Claus catalyst to react the sulfur dioxide and excess hydrogen sulfide to produce elemental sulfur. The elemental sulfur is condensed with heat recovery to produce low pressure steam and elemental sulfur. Two to three stages of catalytic reaction and condensation may be employed with descending reaction temperatures in each stage. A flue gas comprising a residual sulfur compounds stream in line 314 and a condensed sulfur product in line 312 exits the SRU 310. The sulfur compounds stream may comprise carbonyl sulfide, carbon disulfide, hydrogen sulfide, sulfur dioxide, sulfur trioxide and sulfur molecules comprising from two to eight sulfur atoms. The condensed sulfur is cooled and may be filtered to produce a filter cake in line 312. The degassed sulfur may be over 99 wt % pure. Two-stage Claus units are characterized by having a sulfur recovery of 92-94%; whereas, three-stage Claus units have a typical sulfur recovery of 95-96%.

In a case in which a higher sulfur recovery is desired over what can be achieved with a standard two- or three-stage Claus unit, the sulfur compounds stream may be hydrolyzed or hydrogenated to convert carbon disulfide, carbonyl sulfide, sulfur dioxide and sulfur trioxide to produce hydrogen sulfide. The hydrogen sulfide is subsequently selectively removed from the gas via a solvent process, typically using a recirculating amine solvent to absorb hydrogen sulfide to be recycled back to the SRU 310, thereby allowing increased sulfur recovery of up to 99.98%. Alternative to using a combination of hydrotreating and selective solvent removal of hydrogen sulfide, a high efficiency catalytic stage in the form of a selective oxidation reactor could be added downstream of the two- or three-stage Claus plant to increase the overall sulfur recovery up to 99.2-99.5%.

If ammonia were largely present in feed in line 302 to the SRU 310, ammonia would result in a substantial increase in flue gas volume, as for each 100 moles for ammonia combusted, there are 482 moles of combustion products as shown in Formula 1:

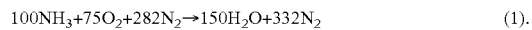

$$100NH_3 + 75O_2 + 282N_2 \rightarrow 150H_2O + 332N_2 \quad (1).$$

Combustion of 100 moles of hydrogen sulfide only produces 288 moles of gaseous combustion products, since the sulfur is condensed and removed as shown in Formula 2:

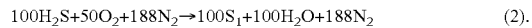

$$100H_2S + 50O_2 + 188N_2 \rightarrow 100S_1 + 100H_2O + 188N_2 \quad (2).$$

Removing ammonia from the hydrogen sulfide stream to SRU 310 will typically result in a 25% reduction is flue gas flow rate because the total combustion product drops from 385 moles to 288 moles. Moreover, extra nitrogen in the flue gas from reacting NH3 dilutes the flue gas, thereby reducing the partial pressures of hydrogen sulfide and sulfur dioxide in the catalytic stages downstream of the combustion, reducing thereby the driving force for the Claus reaction in Formula (3):

$$2H_2S + SO_2 \rightarrow 3S_1 + 2H_2O \quad (3).$$

Water is a product of the Claus reaction in Formula 3. The water formed when ammonia is destroyed increases the water concentration in the process gas, which will shift the equilibrium of the reaction of Formula 1 unfavorably. Taken together nitrogen dilution and the water effect will reduce the theoretical sulfur recovery efficiency of SRU by 1-2%. Removing ammonia from the hydrogen sulfide recovery feed stream in line 302 to the SRU 310 resulting in a 25% reduction in the flue gas flow rate will also reduce steam production because ammonia is no longer combusted in the SRU 310. However, the reduction in steam production will be offset by steam production in the thermal oxidizer 320.

Since the ammonia has been substantially removed from the hydrogen sulfide stream in line 208 through the choice of operating conditions in the sour water stripper 190, the SRU 310 can be reduced in size and achieve a desirable sulfur recovery. Furthermore, the operating temperature of the combustion stage of the SRU 310 can be reduced because the auto ignition temperature of hydrogen sulfide (232° C.) is much lower than that of ammonia (650° C.) thereby resulting in a lower oxidation temperature and corresponding requirement of fuel gas. Moreover, the sulfur compounds stream in line 314 comprising carbon disulfide and carbonyl sulfide, sulfur oxides, hydrogen sulfide and elemental sulfur can be delivered directly to a thermal oxidizer 320 without passing through or processing in a tail gas clean up unit or an advanced Claus unit in case a higher sulfur recovery is desired because additional desulfurization will be achieved by the ammonia scrubber 370 and, perhaps, the alkaline scrubber 380 for polishing.

A hydrogen sulfide oxidizer stream in line 326 may be fed to the thermal oxidizer 320. The sulfur compounds stream in line 314 may also be fed to the thermal oxidizer 320. The hydrogen sulfide oxidizer stream in line 326 may be considered the first hydrogen sulfide steam. Preferably, the hydrogen sulfide stream in line 326 is taken from the gaseous sour hydrogen sulfide stream in line 208. The flow rate of hydrogen sulfide to the thermal oxidizer is set to make sure sufficient sulfur oxides are available to satisfy the stochiometric molar balance with ammonia in the ammonia scrubber 370. A bypass stream in the bypass gaseous hydrogen sulfide line 324 may divert a portion of the gaseous solvent hydrogen sulfide stream from the solvent regenerator overhead line 184 to the hydrogen sulfide oxidizer stream in line 326 through a respective control valve thereon. The bypass stream may be charged with the gaseous sour hydrogen sulfide stream in line 208 to the thermal oxidizer 320 in the oxidizer feed line 315. An oxidizer feed stream in the oxidizer feed line 315 may transport the sulfur compounds stream in line 314 from the SRU 310 and the hydrogen sulfide oxidizer stream in line 326 to the thermal oxidizer 320.

A combustion air stream in line 328 which may be preheated and a fuel gas stream in line 330 may be supplied to the thermal oxidizer 320. The fuel gas stream in line 330 may be taken at least in part from the PSA tail gas stream in line 164 of FIG. 1 comprising hydrogen and hydrocarbons. The fuel gas stream in line 330 may also be taken at least in part from off gas streams from the overhead line 104 from the stripper receiver 102 carrying the net stripper off gas and/or the overhead line 154 from the fractionator recover 150 carrying the fractionator off gas comprising, hydrogen sulfide, hydrocarbons and hydrogen. Moreover, the fuel gas stream in line 330 may further be taken at least in part from the ammonia vapor off-gas stream in line 222 from the ammonia stripper overhead line 218 in FIG. 1 which has caloric value that can be combusted. Additionally, if there are operational issues in the ammonia scrubber 370, the ammonia vapor off-gas stream in line 222 may be diverted to the thermal oxidizer through a control valve on line 332 which is normally closed to be thermally oxidized.

The inlet temperature of the thermal oxidizer 320 is typically in the range of −30° C. to about 500° C. with a pressure of about −1 kPa(g) to about 3000 kPa(g). The outlet temperature is typically in the range of about 600 to about 1300° C. with a pressure of about −1 kPa(g) to about 50 kPa(g). The residence time in the thermal oxidizer 320 is between about 0.5 and about 2 seconds. Any suitable thermal oxidizer 320 could be used, including, but not limited to, an adiabatic thermal oxidizer chamber. The thermal oxidizer 320 can be forced draft, induced draft, or a combination of both.

In the thermal oxidizer 320, hydrocarbons are oxidized to water and carbon dioxide. The hydrogen sulfide and other sulfur compounds in the thermal oxidizer feed are oxidized to sulfur oxide particulates including, but not limited to, $SO_2$ and $SO_3$, and water. The nitrogen from the nitrogen bound molecules which is present in traces from ammonia are converted to nitrogen and NOx, including but not limited to $NO$, $NO_2$. The HCl and $Cl_2$ (if any) remain unoxidized.

An optional selective non-catalytic reduction (SNCR) section 321 may be present in the thermal oxidizer 320 in some cases to convert NOx to molecular nitrogen in the event that ammonia or NOx is fed to the thermal oxidizer 320 such as in line 332. In such case, some of the ammonia in line 332 may be diverted to the SNCR section 321 in line 336 through a control valve thereon. The inlet temperature of the SNCR section is typically in the range of about 650 to about 1300° C. with a pressure of about −1 kPa(g) to about 50 kPa(g). The outlet temperature is typically in the range of about 650 to about 1040° C. with a pressure of about −1 kPa(g) to about 50 kPa(g). The residence time in the SNCR section is between about 0.2 and about 1 seconds. The SNCR section may be separated from the rest of the thermal oxidizer 320 by a choke wall in the vessel that limits entry by oxygen.

A flue gas sulfur oxide stream in a flue gas line 334 from the thermal oxidizer 320 comprises sulfur oxides (i.e., $SO_2$ and $SO_3$) and one or more of $H_2O$, $CO_2$, $N_2$, $O_2$, NOx (i.e., $NO$ and $NO_2$), HCl, and $Cl_2$. The flue gas stream in the flue gas line 334 is sent to an optional waste heat recovery section 340 which may be a waste heat boiler. The inlet temperature of the waste heat recovery section 340 is typically in the range of about 600 to about 1300° C. with a pressure of about −2 kPa(g) to about 50 kPa(g). The outlet temperature is typically in the range of about 200 to about 400° C. with the same pressure range. Suitable waste heat recovery units include, but are not limited to, a waste heat boiler, including, but not limited to, a firetube boiler or a watertube boiler. A boiler feed water stream in line 342 enters the waste heat recovery section 340 in which a portion is vaporized to steam in line 344, with the remainder exiting as blowdown water in line 346. In some cases, the steam can be converted to electricity, for example using a steam turbine, if desired. Oil can be used as a heat exchange media instead of water. The recovered waste heat stream in line 344 can be low, medium or high-pressure or superheated steam. The recovered heat can be used to provide heat to one or more pieces of equipment or process streams in the refinery 1 via line 358. For example, the recovered waste heat in steam can be used to supply heat to reboilers in the columns or provide steam for columns in the refinery 1 of FIG. 1. A portion of the waste heat stream in line 412 may be transported to the drier 410.

A waste heat flue gas sulfur oxide stream in line 348 from the optional waste heat recovery section 340 may be used to preheat combustion air in the quench section 360. Air in line 352 is fed to the air quench section 360 and indirectly heat exchanged with the waste heat flue gas sulfur oxide stream in line 348 to further cool the waste heat flue gas sulfur oxide stream in line 348 and heat the combustion air stream in line 352. The heated combustion air stream is then transported in line 328 to the thermal oxidizer 320. The inlet temperature of the waste heat flue gas to the quench section 360 is typically in the range of 200 to about 400° C. with a pressure of about −2 kPa(g) to about 50 kPa(g). The inlet temperature could be up to about 1300° C. if no waste heat recovery section 340 is utilized. The outlet temperature is typically in the range of about 45 to about 200° C. with a pressure of about −3 kPa(g) to about 50 kPa(g). Additionally, if no waste heat boiler 340 is used, an air or water quench may be used to cool the flue gas stream in this quench section 360 by direct heat exchange instead of, before or after preheating the combustion air in line 352. A water quench stream may be provided to the quench section 360 in quench line 354. The quench water in line 354 may be provided from the stripped water stream in line 226 from the ammonia stripping column 210 in the refinery of FIG. 1.

The cooled flue gas sulfur oxide stream in line 356 from the quench section 360 is sent to an ammonia scrubber section 370 for removal of sulfur oxides by reacting it with ammonia. The inlet temperature of the ammonia scrubber section 370 is typically in the range of about 45 to about 200° C. with a pressure of about −4 kPa(g) to about 50 kPa(g). The outlet temperature is typically in the range of about 45 to about 150° C. with the same pressure range. In the ammonia scrubber section 370, an aqueous ammonia stream may be contacted with the quenched flue gas sulfur oxide stream in line 356. The ammonia stream may be injected into an ammonia scrubber sump in the ammonia scrubber section 370. From this sump, a liquid recycle may be counter-currently contacted with the cooled flue gas sulfur oxide stream in line 356 by injection such as from a multi-level spray header.

In an aspect, the ammonia vapor stream in line 366 may be a first ammonia stream taken from the ammonia vapor off-gas stream in line 222 from the ammonia stripper column 210 in the refinery 1 of FIG. 1. The ammonia vapor stream in line 366 may be cooled and condensed before it is used in the ammonia scrubber 370. A supplemental ammonia stream in line 368 may be utilized to provide ammonia requirements if the refinery 1 does not provide a sufficiently large ammonia feed supply. A water stream in line 362 may be supplied from the stripped water stream in line 226 from the ammonia stripping column 210 in the refinery of FIG. 1. An aeration air stream in line 364 may also be added to the ammonia scrubber 370 to provide aeration in the scrubber and oxygen requirements to promote formation of ammonia sulfate. In the ammonia scrubber 370, a two-step reaction occurs. In the first step, the ammonia reacts with the $SO_2$ and water to produce ammonium sulfite, $(NH_4)_2SO_3$ as in Formula (4):

$$SO_2 + 2NH_3 + H_2O \rightarrow (NH_4)_2SO_3 \qquad (4).$$

In the second step, the produced ammonium sulfite then reacts with oxygen to produce ammonium sulfate, $(NH_4)_2SO_4$ as in Formula (5):

$$(NH_4)_2SO_3 + \tfrac{1}{2}O_2 \rightarrow (NH_4)_2SO_4 \qquad (5).$$

The ammonia also reacts with any chlorine present to produce molecular nitrogen and hydrogen chloride followed by reaction with ammonia to produce ammonium chloride, NH$_4$Cl. Condensed sulfur trioxide in the form of H$_2$SO$_4$ that is present will likely react with ammonia to produce ammonium sulfate.

A reacted flue gas stream in line 372 from the ammonia scrubber section 370 has a reduced level of sulfur oxides and HCl compared to the incoming quenched flue gas stream in line 356 and is fed to an alkaline scrubber section 380 for polishing. An aqueous chemical such as an ammonium sulfate product stream may depart the ammonia scrubber 370 in line 374 for further processing.

In the alkaline scrubber section 380, carry over hydrogen sulfide from the stripped water stream in line 226 from the ammonia stripping column 210 in the reacted flue gas stream may be managed by reacting it with an oxidation media in line 382. Oxidation media may include sodium bisulfite, NaHSO$_3$, or hydrogen peroxide, H$_2$O$_2$ mixed with water in line 376. The water stream in line 376 may be supplied from the stripped water stream in line 226 from the ammonia stripping column 210 in the refinery of FIG. 1. The inlet temperature to the alkaline scrubber section 380 is typically in the range of about 45 to about 150° C. and a pressure of about −4 kPa(g) to about 50 kPa(g). The oxidation media reacts with remaining hydrogen sulfide to produce SO$_2$, SO$_3$ and water. An alkaline stream comprising sodium or potassium hydroxide or liquid ammonia in line 384 may also added to the alkaline scrubber section 380 to convert sulfur compounds to (NH$_4$)$_2$SO$_3$, (NH$_4$)$_2$SO$_4$, Na$_2$SO$_3$, Na$_2$SO$_4$, K$_2$SO$_3$, K$_2$SO$_4$ and water which are removed in a brine or fertilizer effluent stream in line 386. An air stream in line 378 may be fed to the alkaline scrubber section 380 to produce necessary chemicals or reduce chemical oxygen demand.

The alkaline scrubbed reacted flue gas stream comprises water, nitrogen, oxygen and carbon dioxide and may be exhausted to atmosphere in line 387 because it is sufficiently clean to meet environmental emission regulations. However, if ammonia is fed to the thermal oxidizer 320 or if volatile organic compounds (VOC) are present in excess of environmental limits the alkaline scrubbed reacted flue gas stream exits the alkaline scrubber section 380 in line 388 through a normally closed control valve thereon and may be fed to a NOx reduction unit 390 to remove remnant NOx. The inlet temperature of the NOx reduction unit 390 is typically in the range of about 150 to about 300° C. with a pressure of about −5 kPa(g) to about 50 kPa(g). The outlet temperature is typically in the range of about 200 to about 350° C. with the same pressure range. The alkaline scrubbed reacted flue gas stream in line 388 may need to be heated to obtain the desired inlet temperature for the NOx reduction SCR unit 390. The NOx reduction unit 390 can react ammonia from an ammonia stream in line 394 with NOx to produce molecular nitrogen and water. In an aspect, the ammonia vapor stream in line 394 may be a second ammonia stream taken from the ammonia vapor off-gas stream in line 222 from the ammonia stripper column 210 in the refinery 1 of FIG. 1. Any suitable NOx reduction catalyst can be used, including but not limited to, a ceramic, carrier material such as titanium oxide with active catalytic components such as oxides of base metals including TiO$_2$, WO$_3$ and V$_2$O$_5$, or an activated carbon-based catalyst. Additionally, an additional bed of catalyst for combusting VOC's may also be employed in the NOx reduction unit 390. A noble metal supported on an alumina may be used for combusting VOC's. The NOx reduced outlet flue gas stream 392 comprises one or more of water, carbon dioxide, oxygen and molecular nitrogen which can be vented to the atmosphere in line 392.

The aqueous ammonium sulfate stream departing the ammonia scrubber 370 in line 374 may have sufficient quality to be further processed to produce a fertilizer product. Additionally, the brine effluent in line 386 may also supplement aqueous ammonium sulfate stream in line 374. The ammonium sulfate is a precipitate that can be separated physically from a bulk of the water in a water separator 400. The water separator may be any type of liquid-solid separator such as a hydrocyclone or a centrifuge. To ensure that hydrogen sulfide is maintained below emission limits, a stream of an oxidation agent such as hydrogen peroxide may be sprayed or injected from line 406 into the water separator 400. Hydrogen peroxide will react with any residual hydrogen sulfide to produce elemental sulfur and water in an acidic or neutral environment and soluble sulfate in an alkaline environment. Water is removed in line 402 while a damp fertilizer cake is transported in line 404 to a drier 410.

In the drier 410, the damp fertilizer cake may be dried by heat exchange with a waste heat stream 412 from the waste heat recovery section 340 and/or from an external heat drying stream. An external heat drying stream in line 413 may comprise warm, dehumidified air with a dew point of less than about 0° C. that may be blown over the damp fertilizer cake to dry the fertilizer. Dried fertilizer can be taken in line 414 to packaging or application while a cooled waste heat stream which may be present in line 350 can be recycled to the quench section 360 via the waste heat flue gas sulfur oxide stream in line 348. Alternatively, some or all of the cooled waste heat stream in line 350 may be redirected to the thermal oxidizer 320 via line 398 through a control valve thereon to provide oxygen requirements. The drying exhaust air stream may vent from the drier 410 in line 416. The drying exhaust air stream may comprise fertilizer fines and hydrogen sulfide, so it may not be vented to the atmosphere. Instead of conventionally scrubbing this stream to remove fertilizer fines and hydrogen sulfide, it may be fed back to the thermal oxidizer 320 via line 398 through a control valve thereon. Alternatively, the drying exhaust air stream may be vented to the cooled waste heat stream in line 350 via tie line 418 through a control valve thereon and be recycled to waste heat flue gas sulfur oxide stream in line 348 in route to the quench section 360.

Figure 3:
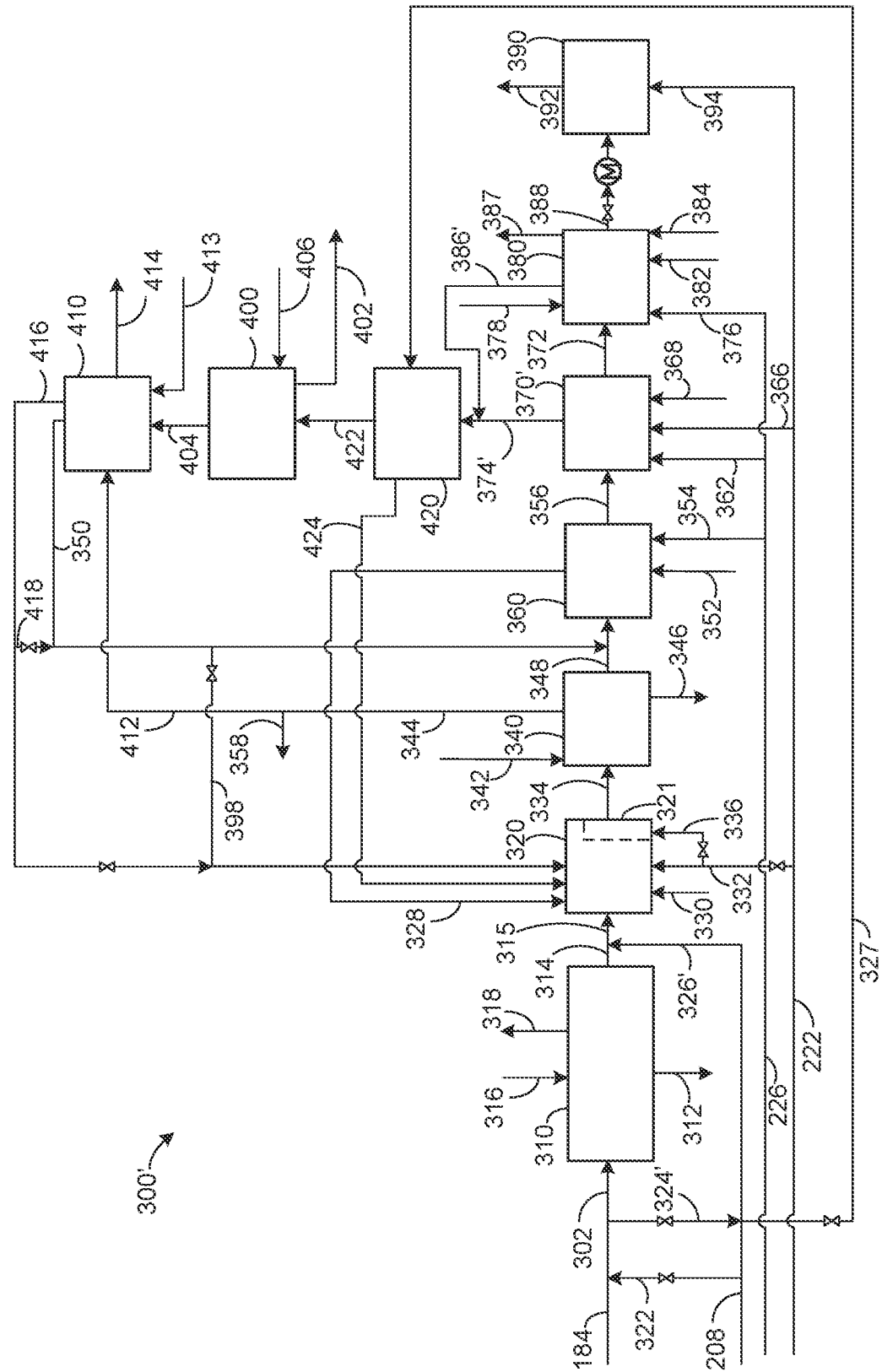
FIG. 3 is an alternative process flow diagram of FIG. 2.

An alternate embodiment to FIG. 2 of a sulfur utilization unit 300' is provided in FIG. 3 in which aeration air is not utilized in the ammonia scrubber 370 but employs a two-stage reaction of ammonia and sulfur oxide. Elements in FIG. 3 with the same configuration as in FIG. 2 will have the same reference numeral as in FIG. 2. Elements in FIG. 3 which have a different configuration as the corresponding element in FIG. 2 will have the same reference numeral but designated with a prime symbol ('). The configuration and operation of the embodiment of FIG. 3 is essentially the same as in FIG. 2 with the following exceptions.

A hydrogen sulfide stream in line 327 is taken to feed a sulfidation reactor 420. The hydrogen sulfide stream in line 327 may be taken from the gaseous solvent hydrogen sulfide stream from the solvent regenerator overhead line 184 and/or the gaseous sour hydrogen sulfide stream from the sour water stripper overhead line 208 from the sour water stripper column 190. In an embodiment, a stream may be taken from the hydrogen sulfide recovery feed stream in line 302 that feeds the SRU 310 via line 324' or from the sour gaseous hydrogen sulfide stream in line 208 from the sour water stripper column 190 through a line 327 through a control valve thereon. Accordingly, a first hydrogen sulfide stream in line 326' feeds the thermal oxidizer 320, a second hydrogen sulfide stream in line 302 feeds the SRU 310 and a third hydrogen sulfide stream in line 327 may feed the sulfidation reactor 420.

In the ammonia scrubber section 370' three reaction steps occur. In a first step, ammonia is reacted with water to produce ammonium hydroxide in Formula (6):

$$NH_3 + H_2O \rightarrow NH_4OH \qquad (6).$$

In the second step, the produced ammonium hydroxide is reacted with sulfur dioxide to produce ammonium bisulfite in Formula (7):

$$NH_4OH + SO_2 \rightarrow NH_4HSO_3 \qquad (7).$$

Meanwhile, in the third step, the ammonium bisulfite decomposes to diammonium sulfite, sulfur dioxide and water in a reversible reaction in Formula (8):

$$(NH_4)_2SO_3 + SO_2 + H_2O \leftrightharpoons 2NH_4HSO_3 \qquad (8).$$

The inlet temperature of the ammonia scrubber section 370' is typically in the range of about 45 to about 150° C. with a pressure of about −4 kPa(g) to about 50 kPa(g). The outlet temperature is typically in the range of about 45 to about 150° C. with the same pressure range. A reacted flue gas stream in line 372 from the ammonia scrubber section 370' has a reduced level of $SO_2$ and $Cl_2$ compared to the incoming quenched flue gas stream in line 356 and is fed to an alkaline scrubber section 380. The mixture of aqueous ammonium bisulfite and ammonium sulfite stream may depart the ammonia scrubber 370' in line 374' to be further reacted in a sulfidation reactor 420.

In the sulfidation reactor, a second stage of reaction occurs in a fourth reaction step. The hydrogen sulfide in the third hydrogen sulfide stream in line 327 is reacted with ammonium bisulfite to produce ammonium thiosulfate and water in Formula (9).

$$2H_2S + 2NH_4HSO_3 + 2(NH_4)_2SO_3 \rightarrow 3(NH_4)_2S_2O_3 + 3H_2O \qquad (9).$$

The aqueous ammonium thiosulfate is discharged from the sulfidation reactor 420 in line 422 to be further processed as described for FIG. 2 starting in the water separator 400. The exhaust hydrogen sulfide gas stream may be delivered back to the thermal oxidizer 320' in line 424. Additionally, the brine stream in line 386' may also comprise ammonium sulfite which may supplement the ammonium sulfite in line 374'.

The rest of FIG. 3 operates as described for FIG. 2.

An alternate embodiment to FIG. 2 of a sulfur utilization unit 300* is provided in FIG. 4 in which an ammonia stripper column 210 is bypassed or omitted in FIG. 1. Elements in FIG. 4 with the same configuration as in FIG. 2 will have the same reference numeral as in FIG. 2. Elements in FIG. 4 which have a different configuration as the corresponding element in FIG. 2 will have the same reference numeral but designated with an asterisk symbol (*). The configuration and operation of the embodiment of FIG. 4 is essentially the same as in FIG. 2 with the following exceptions.

Because the ammonia stripper column 210 is not utilized in this embodiment, the stripped water stream in line 226 and the ammonia vapor off-gas stream in line 222 stream are not available from the refinery 1 of FIG. 1. Hence, the hydrogen sulfide lean stream in line 214 may be taken in line 230 of FIG. 1 to provide the aqueous ammonia stream in line 368* supplanting the need for water to be mixed with the vaporous ammonia stream in the ammonia scrubber section 370*. The hydrogen sulfide lean stream in line 230 may be diverted to the thermal oxidizer 320 if the ammonia scrubber section 370* is operating less than optimally. Supplemental ammonia from line 396 can be provided in line 362* to supplement the ammonia scrubber section 370* and in line 394* to supplement the NOx reduction unit 390. Another water stream in line 376* will provide water for the alkaline scrubber section 380. The rest of FIG. 4 operates as described for FIG. 2.

Figure 5:
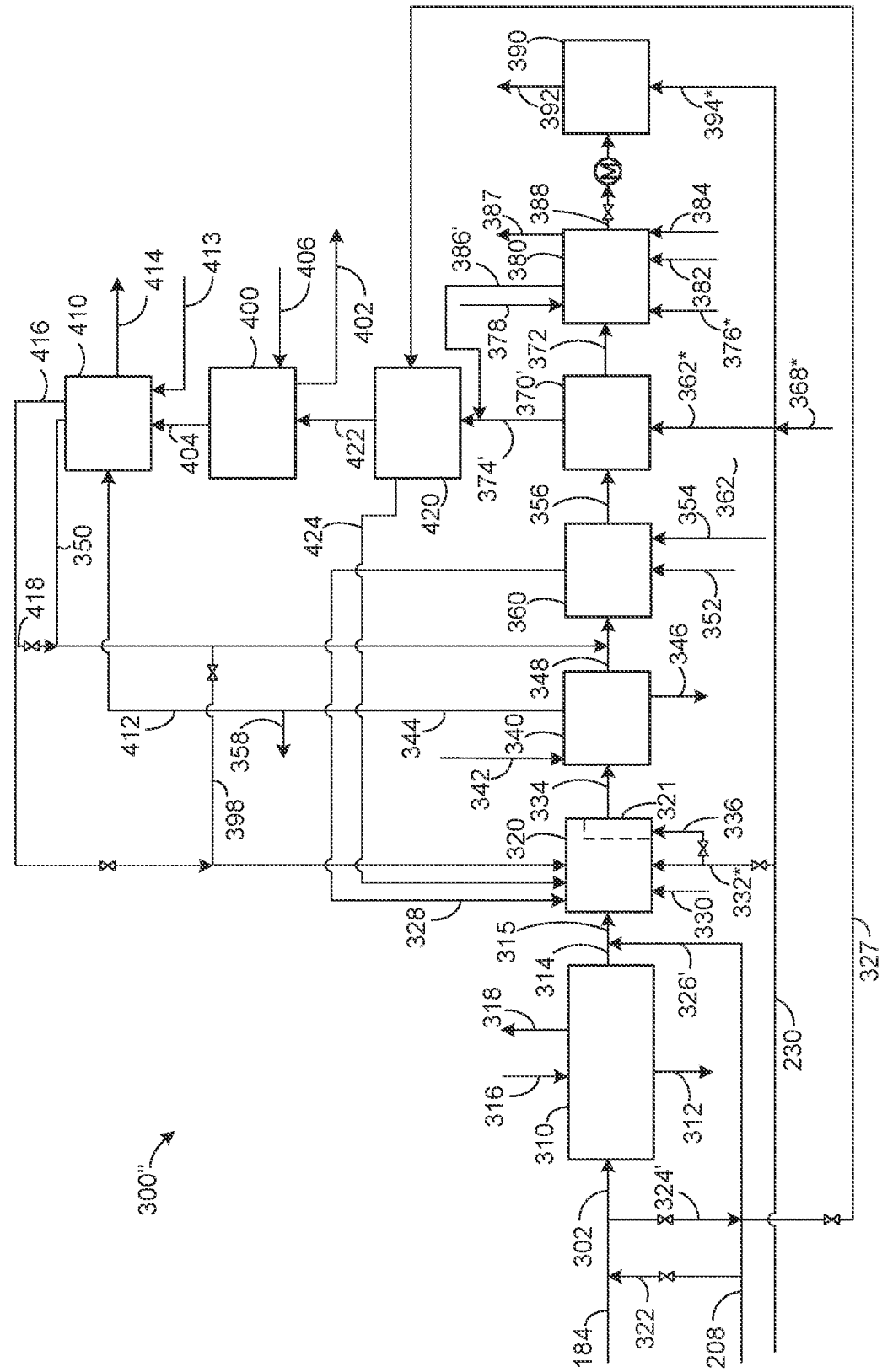
FIG. 5 is an alternative process flow diagram of FIGS. 3 and 4.

An alternate embodiment to FIGS. 3 and 4 of a sulfur utilization unit 300" is provided in FIG. 5 in which an ammonia stripper column 210 is bypassed or omitted in FIG. 1. Elements in FIG. 5 with the same configuration as in FIG. 3 or 4 will have the same reference numeral as in FIG. 3 or 4, respectively. Elements in FIG. 5 which have a different configuration as the corresponding element in FIG. 3 or 4 will have the same reference numeral but designated with a double prime symbol ("). The configuration and operation of the embodiment of FIG. 5 is essentially the same as in FIGS. 3 and 4 with the following exceptions.

A third hydrogen sulfide stream in line 327 is taken to feed a sulfidation reactor 420 as in FIG. 3. Additionally, the hydrogen sulfide lean stream in line 214 may be taken in line 230 of FIG. 1 to provide the aqueous ammonia stream in line 368* supplanting the need for water to be mixed with the vaporous ammonia stream in the ammonia scrubber section 370*. The hydrogen sulfide lean stream in line 230 may also be diverted to the thermal oxidizer 320 if the ammonia scrubber section 370* is operating less than optimally. Supplemental ammonia from line 396 can be provided in line 362* to supplement the ammonia scrubber section 370* and in line 394* to supplement the NOx reduction unit 390.

The rest of FIG. 5 operates as described for FIG. 3.

Figure 6:
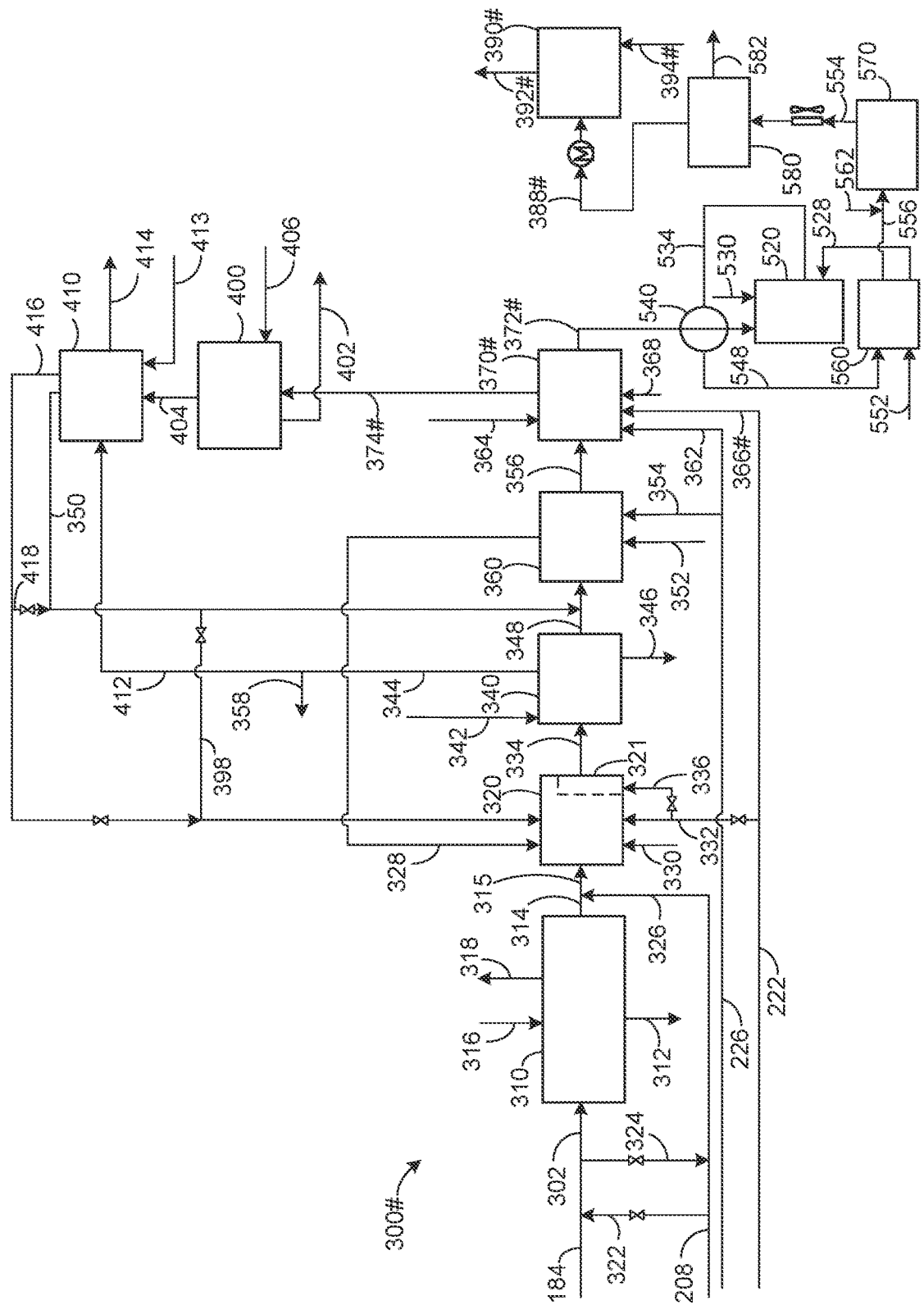
FIG. 6 is a further alternative process flow diagram of FIG. 2.

A further alternative embodiment to FIG. 2 of a sulfur utilization unit 300 # is provided in FIG. 6 in which the ammonia vapor off-gas stream in line 222 from an ammonia stripper overhead liquid stream has a high concentration of hydrogen sulfide. Elements in FIG. 6 with the same configuration as in FIG. 2 will have the same reference numeral as in FIG. 2. Elements in FIG. 6 which have a different configuration as the corresponding element in FIG. 2 will have the same reference numeral but designated with a hashtag symbol (#). The configuration and operation of the embodiment of FIG. 6 is essentially the same as in FIG. 2 with the following exceptions.

The cooled flue gas sulfur oxide stream in line 356 from the quench section 360 is sent to an ammonia scrubber section 370 # for removal of SOx by reacting it with ammonia. The inlet temperature of the ammonia scrubber section 370 # is typically in the range of about 45 to about 200° C. with a pressure of about −4 kPa(g) to about 50 kPa(g). The outlet temperature is typically in the range of about 45 to about 150° C. with the same pressure range. In the ammonia scrubber section 370 #, an aqueous ammonia stream may be contacted with the quenched flue gas sulfur oxide stream in line 356. The ammonia stream may be injected into an ammonia scrubber sump in the ammonia scrubber section 370 #. From this sump, a liquid recycle may be counter-currently contacted with the cooled flue gas sulfur oxide stream in line 356 by injection from such as a multi-level spray header.

In an aspect, the ammonia stream in line 366 # may be a first ammonia stream taken from the ammonia vapor off-gas stream in line 222 from the ammonia stripper column 210 in the refinery 1 of FIG. 1. The ammonia stream in line 366 # may be cooled and condensed before it is used in the ammonia scrubber 370 #. Alternatively, the ammonia stream may be taken from the hydrogen sulfide lean stream in line 214 taken in line 230 perhaps after vaporization. The ammonia vapor stream in line 366 # fed to the ammonia scrubber section 370 # may have a high concentration of hydrogen sulfide, such as over 4 mol %, suitably over 5 mol % and more suitably over 6 mol % and preferably no more than 10 mol %. A supplemental ammonia stream in line 368 may be utilized to provide ammonia requirements if the refinery 1 does not provide a sufficiently large ammonia feed supply. A water stream in line 362 may be supplied to the ammonia scrubber sump and/or a liquid recirculation line from the stripped water stream in line 226 from the ammonia stripping column 210 in the refinery of FIG. 1. An aeration air stream in line 364 may also be added to the ammonia scrubber 370 # to provide aeration in the scrubber and oxygen requirements to promote formation of ammonia sulfate. In the ammonia scrubber 370 #, with substantial hydrogen sulfide present, the following sequence of reactions occurs. In the first step, the ammonia reacts with water to produce ammonium hydroxide as in Formula (6):

$$NH_3 + H_2O \rightarrow NH_4OH \qquad (6).$$

In the second step, the produced ammonium hydroxide is reacted with sulfur dioxide to produce ammonium bisulfite in Formula (7):

$$NH_4OH + SO_2 \rightarrow NH_4HSO_3 \qquad (7).$$

Meanwhile, in the third step, the ammonium bisulfite decomposes to diammonium sulfite, sulfur dioxide and water in a reversible reaction in Formula (8):

$$2NH_4HSO_3 \Leftrightarrow (NH_4)_2SO_3 + SO_2 + H_2O \qquad (8).$$
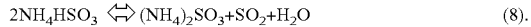

In a fourth step, the produced diammonium sulfite then reacts with oxygen in the air stream 364 to produce ammonium sulfate, $(NH_4)_2SO_4$ as in Formula (5):

$$(NH_4)_2SO_3 + \tfrac{1}{2}O_2 \rightarrow (NH_4)_2SO_4 \qquad (5).$$

The substantial hydrogen sulfide reacts with diammonium sulfite and ammonium bisulfite to produce ammonium thiosulfate and water in Formulas (9), (10) and (11).

$$2H_2S + 2NH_4HSO_3 + 2(NH_4)_2SO_3 \rightarrow 3(NH_4)_2S_2O_3 + 3H_2O \qquad (9),$$
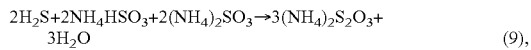

$$4NH_4HSO_3 + 2NH_3 + 2H_2S \rightarrow 3(NH_4)_2S_2O_3 + H_2O \qquad (10), \text{ and}$$
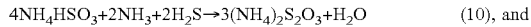

$$4(NH_4)_2SO_3 + 2H_2S \rightarrow 3(NH_4)_2S_2O_3 + 2NH_3 + 3H_2O \qquad (11).$$
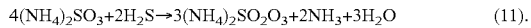

The ammonia also reacts with any chlorine present to produce molecular nitrogen and hydrogen chloride followed by reaction with ammonia to produce ammonium chloride, $NH_4Cl$. Condensed sulfur trioxide in the form of $H_2SO_4$ that is present will likely react with ammonia to produce ammonium sulfate.

A reacted flue gas stream in line 372 # from the ammonia scrubber section has a reduced level of sulfur oxides and HCl compared to the incoming quenched flue gas stream in line 356. An aqueous chemical such as an ammonium thiosulfate product stream may depart the ammonia scrubber 370 # in line 374 # for further processing.

The reacted flue gas stream in line 372 # still may have hydrogen sulfide above acceptable limits. The hydrogen sulfide is managed by thermally oxidizing the reacted flue gas stream in line 372 # from the ammonia scrubber section 370 # in a second thermal oxidizer 520. The reacted flue gas stream in line 372 # may have a temperature typically in the range of about 45 to about 150° C. and a pressure of about −4 kPa(g) to about 50 kPa(g). The reacted flue gas stream in line 372 # may be heated by heat exchange with a flue gas sulfur oxide stream in a second flue gas line 534 in a waste heat exchanger 540 and fed to the second thermal oxidizer 520.

A second combustion air stream in line 528 which may be preheated and a fuel gas stream in line 530 may be supplied to the thermal oxidizer 520. The fuel gas stream in line 530 may be taken at least in part from the PSA tail gas stream in line 164 of FIG. 1 comprising hydrogen and hydrocarbons. The fuel gas stream in line 530 may also be taken at least in part from off gas streams from the overhead line 104 from the stripper receiver 102 carrying the net stripper off gas and/or the overhead line 154 from the fractionator recover 150 carrying the fractionator off gas comprising, hydrogen sulfide, hydrocarbons and hydrogen.

The inlet temperature to the thermal oxidizer 520 is typically in the range of 120° C. to about 500° C. with a pressure of about −1 kPa(g) to about 100 kPa(g). The outlet temperature is typically in the range of about 450 to about 650° C. with a pressure of about −1 kPa(g) to about 50 kPa(g). The residence time in the thermal oxidizer 520 is between about 0.5 and about 2 seconds. Any suitable thermal oxidizer 520 could be used, including, but not limited to, an adiabatic thermal oxidizer chamber. The second thermal oxidizer 520 can be forced draft, induced draft, or a combination of both. The second thermal oxidizer 520 may include an inline burner.

In the thermal oxidizer 520, hydrocarbons are oxidized to water and carbon dioxide. The hydrogen sulfide and other sulfur compounds in the thermal oxidizer feed are oxidized to sulfur oxide particulate sulfur oxides including, but not limited to, $SO_2$ and $SO_3$, and water. The nitrogen from the nitrogen bound molecules which is present in traces from ammonia are converted to nitrogen and NOx, including but not limited to NO, $NO_2$. The HCl and $Cl_2$ (if any) remain unoxidized.

A second flue gas sulfur oxide stream in a flue gas line 534 from the thermal oxidizer 520 comprises sulfur oxides (i.e., $SO_2$ and $SO_3$) and one or more of $H_2O$, $CO_2$, $N_2$, $O_2$, NOx (i.e., NO and $NO_2$), HCl, and $Cl_2$. The flue gas stream in the flue gas line 534 is sent to the waste heat exchanger 540 for heat exchange with the reacted flue gas stream 372 #. The inlet temperature of the waste heat exchanger 540 is suitably in the range of about 450 to about 650° C. with a pressure of about −2 kPa(g) to about 50 kPa(g). However, if hydrocarbons such as alkylaromatics, phenols or cyanides are present which require removal by combustion, the inlet temperature may need to be as high as 1100° C. The outlet temperature is typically in the range of about 150 to about 425° C. with the same pressure range.

A second waste heat flue gas sulfur oxide stream in line 548 from the waste heat exchanger 540 may be used to preheat combustion air in a second quench section 560. Air in line 552 may be fed to the air quench section 560 and indirectly or directly heat exchanged with the waste heat flue gas sulfur oxide stream in line 548. Air in line 552 may be directly injected into the second waste heat flue gas sulfur oxides stream in line 548 as necessary to reduce the flue gas temperature. Alternatively, the combustion air stream in line 552 may be indirectly heat exchanged with the second waste heat flue gas sulfur oxide stream in line 548 to further cool the waste heat flue gas sulfur oxide stream and heat the combustion air stream in line 552. The heated combustion air stream would then be transported in line 528 back to the thermal oxidizer 520. The inlet temperature of the waste heat flue gas to the quench section 560 is typically in the range of 150 to about 425° C. and perhaps up to 800° C. if hydrocarbons such as alkylaromatics, phenols or cyanides requiring combustion are present in the waste heat flue gas stream with a pressure of about −2 kPa(g) to about 50 kPa(g). If no waste heat recovery section 540 is utilized, the inlet temperature could be up to about 650° C. or up to 1100° C. if hydrocarbons such as alkylaromatics, phenols or cyanides requiring combustion are present. The outlet temperature is typically in the range of about 150 to about 250° C. with a pressure of about −3 kPa(g) to about 50 kPa(g). Additionally, if no waste heat boiler 540 is used, an air or water quench may be used to cool the flue gas stream in the second quench section 560 by direct heat exchange instead of, before or after preheating the combustion air in line 552.

The second quenched flue gas sulfur oxide stream in line 556 must be treated to remove sulfur oxides. In an embodiment, a dry sorbent is injected from line 562 into the second quenched flue gas sulfur oxide stream in line 556. The dry sorbent may be pneumatically injected into the second quenched flue gas stream. The sorbent injected flue gas sulfur oxide stream in line 556 may be charged to a dry sorbent reactor 570 to ensure sufficient mixing residence time is provided to achieve reaction of sufficient sulfur oxides to meet emissions requirements for the final vent gas stream.

The dry sorbent may comprise sodium or calcium adsorbents. Calcium adsorbent comprises calcium hydroxide and may react with sulfur oxides as in Formulas (12) and (13):

$$SO_2 + Ca(OH)_2 \rightarrow CaSO_3 \cdot \tfrac{1}{2}H_2O + \tfrac{1}{2}H_2O \quad (12), \text{ and}$$

$$SO_3 + Ca(OH)_2 \rightarrow CaSO_4 + H_2O \quad (13).$$

Sodium adsorbent may comprise sodium carbonate (NaHCO$_3$) or Trona (Na$_2$CO$_3$.NaHCO$_3$.H$_2$O). The sodium sorbent is injected directly into the hot flue gas in which it is calcined into porous activated sodium carbonate (Na$_2$CO$_3$) as shown in Formula (14):

$$NaHCO_3 \rightarrow Na_2CO_3 + CO_2 + H_2O \quad (14).$$

The thermal decomposition reaction of Formula (14) occurs rapidly at elevated temperatures such as 80 to about 800° C. The high surface area created enables fast gas-solid reactions between sulfur oxides and Na$_2$CO$_3$ to form Na$_2$SO$_4$ as shown in Formulas (15) and (16):

$$Na_2CO_3 + SO_2 + \tfrac{1}{2}O_2 \rightarrow Na_2SO_4 + CO_2 \quad (15), \text{ and}$$

$$Na_2CO_3 + SO_3 + \tfrac{1}{2}O_2 \rightarrow Na_2SO_4 + CO_2 \quad (16).$$

The reaction of adsorbent and sulfur oxides produces a sulfate salt flue gas stream in line 554 at a temperature of about 260° C. to about 343° C. and a pressure of about −3 kPa(g) to about 50 kPa(g). The sulfate salt particles are solid and can be removed from the second flue gas stream. Sulfate salt particles include CaSO$_3$.½H$_2$O, CaSO$_4$ or Na$_2$SO$_4$. The sulfate salt flue gas stream in line 554 may be cooled to below about 220° C. and fed to a particulate removal section 580. A sulfate salt residue stream may be removed from the particulate removal section 580 such as by an augur in line 582 and be sold as a valuable product for glass, detergent or paint manufacture.

In the particulate removal section 580 sulfate salts are separated from the sulfate depleted flue gas stream by either by fabric, steel or ceramic filters or electrostatic precipitators. For example, a bag-house filter may contain filter bags that allow for the clean flue gas to pass through while retaining the suspended solid particulates with periodic blow-back to clean particulates from the filters. Cooling of the sulfate salt flue gas stream in line 554 may not be necessary if high-temperature, ceramic or stainless steel filters are used in the particulate removal section 580.

A sulfate depleted flue gas stream in line 388 # may be heated and fed to a NOx reduction unit 390 # to remove remnant NOx. The inlet temperature of the NOx reduction unit 390 # is typically in the range of about 150 to about 300° C. with a pressure of about −5 kPa(g) to about 50 kPa(g). The outlet temperature is typically in the range of about 200 to about 350° C. with the same pressure range. The sulfate depleted flue gas stream in line 388 # may need to be heated to obtain the desired inlet temperature for the NOx reduction SCR unit 390 #. Any suitable NOx reduction catalyst can be used, including but not limited to, ceramic carrier materials such as titanium oxide with active catalytic components such as oxides of base metals including TiO$_2$, WO$_3$ and V$_2$O$_5$, or an activated carbon based catalyst. The NOx reduced outlet flue gas stream 392 # comprises one or more of water, carbon dioxide, oxygen and molecular nitrogen which can be vented to the atmosphere in line 392.

The disclosed process and apparatus provide a way to manage refinery sulfur and perhaps ammonia by reacting them together. The reaction can produce fertilizer giving the refinery another revenue source from waste streams. Additionally, if the sulfur load to existing SRU increases, instead of investing in additional SRU capacity, sending ammonia and hydrogen sulfide in separate streams to the sulfur utilization unit 300 to perhaps produce fertilizer will obviate the need for additional SRU capacity.

SPECIFIC EMBODIMENTS

While the following is described in conjunction with specific embodiments, it will be understood that this description is intended to illustrate and not limit the scope of the preceding description and the appended claims.

A first embodiment of the disclosure is a process for managing hydrogen sulfide in a refinery comprising thermally oxidizing a first hydrogen sulfide stream from the refinery to produce a sulfur oxide stream; reacting the sulfur oxide stream with an ammonia stream. An embodiment of the disclosure is one, any or all of prior embodiments in this paragraph up through the first embodiment in this paragraph further comprising feeding a second hydrogen sulfide stream from the refinery to a sulfur recovery unit to produce sulfur and a sulfur compounds stream; and thermally oxidizing the sulfur compounds stream with the hydrogen sulfide stream. An embodiment of the disclosure is one, any or all of prior embodiments in this paragraph up through the first embodiment in this paragraph further comprising taking one of the first hydrogen sulfide stream and the second hydrogen sulfide from a sour water stripper and/or a solvent regeneration column. An embodiment of the disclosure is one, any or all of prior embodiments in this paragraph up through the first embodiment in this paragraph wherein the sour water stripper strips hydrogen sulfide from a sour water stream to provide the first hydrogen sulfide stream and a hydrogen sulfide lean stream comprising the ammonia stream. An embodiment of the disclosure is one, any or all of prior embodiments in this paragraph up through the first embodiment in this paragraph further comprising thermally oxidizing the reacted stream to provide a second flue gas stream comprising sulfur oxide. An embodiment of the disclosure is one, any or all of prior embodiments in this paragraph up through the first embodiment in this paragraph further comprising stripping ammonia from the hydrogen sulfide lean stream to provide the ammonia stream. An embodiment of the disclosure is one, any or all of prior embodiments in this paragraph up through the first embodiment in this paragraph further comprising thermally oxidizing the reacted stream to provide a second flue gas stream comprising sulfur oxide. An embodiment of the disclosure is one, any or all of prior embodiments in this paragraph up through the first embodiment in this paragraph further comprising reacting an adsorbent with sulfur oxides in the second flue gas stream to provide a sulfate salt and removing the sulfate salt from the second flue gas. An embodiment of the disclosure is one, any or all of prior embodiments in this paragraph up through the first embodiment in this paragraph further comprising reacting remnant NOx in a reacted flue gas stream from the reacting step with ammonia from the sour water stripper to produce molecular nitrogen. An embodiment of the disclosure is one, any or all of prior embodiments in this paragraph up through the first embodiment in this paragraph further comprising passing the sulfur compounds stream comprising carbon sulfides to the thermal oxidizing step. An embodiment of the disclosure is one, any or all of prior embodiments in this paragraph up through the first embodiment in this paragraph further comprising combusting hydrogen sulfide in the sulfur recovery unit to produce elemental sulfur, condensing the elemental sulfur from the flue gas to provide the sulfur compounds stream and thermally oxidizing the sulfur compounds stream. An embodiment of the disclosure is one, any or all of prior embodiments in this paragraph up through the first embodiment in this paragraph further comprising combusting a fuel stream from the refinery to generate heat for the thermal oxidizing step. An embodiment of the disclosure is one, any or all of prior embodiments in this paragraph up through the first embodiment in this paragraph wherein the fuel stream is taken from a pressure swing adsorption tail gas and/or from an off-gas stream from a fractionation column in a hydroprocessing unit An embodiment of the disclosure is one, any or all of prior embodiments in this paragraph up through the first embodiment in this paragraph further comprising reducing the temperature of the sulfur oxide stream by heat exchange before it is reacted with the ammonia stream. An embodiment of the disclosure is one, any or all of prior embodiments in this paragraph up through the first embodiment in this paragraph further comprising quenching the sulfur oxide stream with water from a sour water stripper. An embodiment of the disclosure is one, any or all of prior embodiments in this paragraph up through the first embodiment in this paragraph further comprising reacting remnant NOx in a reacted flue gas stream from the reacting step with ammonia to produce molecular nitrogen. An embodiment of the disclosure is one, any or all of prior embodiments in this paragraph up through the first embodiment in this paragraph further comprising feeding a third hydrogen sulfide stream to a sulfidation reaction in which ammonium bisulfite from the reacting step is sulfided with hydrogen sulfide from the third hydrogen sulfide stream to produce ammonium thiosulfate. An embodiment of the disclosure is one, any or all of prior embodiments in this paragraph up through the first embodiment in this paragraph wherein the reacting step produces a product of ammonium sulfate and drying the product with an air stream and returning the air stream upstream of the reacting step. An embodiment of the disclosure is one, any or all of prior embodiments in this paragraph up through the first embodiment in this paragraph further comprising returning the air stream to the thermal oxidizing step. An embodiment of the disclosure is one, any or all of prior embodiments in this paragraph up through the first embodiment in this paragraph wherein the drying step includes a water separation step and further comprising spraying an oxidation agent into the water separation step to oxidize residual hydrogen sulfide.

A second embodiment of the disclosure is a process for managing hydrogen sulfide in a refinery comprising stripping hydrogen sulfide from a sour water stream from the refinery to provide a hydrogen sulfide stream and a hydrogen sulfide lean stream comprising ammonia; feeding the hydrogen sulfide rich stream to a sulfur recovery unit to produce sulfur and a sulfur compounds stream; thermally oxidizing the hydrogen sulfide stream to produce a sulfur oxide stream; reacting the sulfur oxide stream with the hydrogen sulfide lean stream to produce a reacted flue gas stream. An embodiment of the disclosure is one, any or all of prior embodiments in this paragraph up through the second embodiment in this paragraph further comprising stripping ammonia from the hydrogen sulfide lean stream to provide the ammonia stream. An embodiment of the disclosure is one, any or all of prior embodiments in this paragraph up through the second embodiment in this paragraph further comprising reacting the sulfur oxide stream with ammonia in a first ammonia stream and reacting remnant NOx in the reacted flue gas stream with ammonia in a second ammonia stream to produce molecular nitrogen and either or both of the first ammonia stream and the second ammonia stream can be taken from the hydrogen sulfide lean stream. An embodiment of the disclosure is one, any or all of prior embodiments in this paragraph up through the second embodiment in this paragraph further comprising feeding a second hydrogen sulfide stream from the refinery to a sulfur recovery unit to produce sulfur and a sulfur compounds stream; and thermally oxidizing the sulfur compounds stream with the hydrogen sulfide stream.

A third embodiment of the disclosure is a process for producing fertilizer in a refinery comprising feeding a hydrogen sulfide stream from the refinery to a sulfur recovery unit to produce sulfur and a sulfur compounds stream; thermally oxidizing the sulfur compounds stream comprising carbon sulfides to produce a sulfur oxide stream; reacting the sulfur oxide stream with an ammonia stream. An embodiment of the disclosure is one, any or all of prior embodiments in this paragraph up through the third embodiment in this paragraph wherein the hydrogen sulfide stream has less than 10 mol % ammonia. An embodiment of the disclosure is one, any or all of prior embodiments in this paragraph up through the third embodiment in this paragraph further comprising taking the hydrogen sulfide stream from a sour water stripper and/or an amine regeneration unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for managing hydrogen sulfide in a refinery comprising:
thermally oxidizing a first hydrogen sulfide stream from said refinery to produce a sulfur oxide stream;
reacting said sulfur oxide stream with an ammonia stream;

feeding a second hydrogen sulfide stream from said refinery to a sulfur recovery unit to produce sulfur and a sulfur compounds stream; and thermally oxidizing said sulfur compounds stream with said hydrogen sulfide stream.

2. The process of claim 1 further comprising taking one of said first hydrogen sulfide stream and said second hydrogen sulfide stream from a sour water stripper and/or a solvent regeneration column.

3. The process of claim 2 wherein said sour water stripper strips hydrogen sulfide from a sour water stream to provide said first hydrogen sulfide stream and a hydrogen sulfide lean stream comprising said ammonia stream.

4. The process of claim 3 further comprising thermally oxidizing said reacted stream to provide a second flue gas stream comprising sulfur oxide.

5. The process of claim 3 further comprising stripping ammonia from said hydrogen sulfide lean stream to provide said ammonia stream.

6. The process of claim 5 further comprising thermally oxidizing said reacted stream to provide a second flue gas stream comprising sulfur oxide.

7. The process of claim 6 further comprising reacting an adsorbent with sulfur oxides in said second flue gas stream to provide a sulfate salt and removing said sulfate salt from said second flue gas.

8. The process of claim 3 further comprising reacting remnant NOx in a reacted flue gas stream from said reacting step with ammonia from said sour water stripper to produce molecular nitrogen.

9. The process of claim 1 further comprising passing said sulfur compounds stream comprising carbon sulfides to said thermal oxidizing step.

10. The process of claim 1 further comprising combusting hydrogen sulfide in the sulfur recovery unit to produce elemental sulfur, condensing the elemental sulfur from the flue gas to provide the sulfur compounds stream and thermally oxidizing the sulfur compounds stream.

11. The process of claim 1 further comprising combusting a fuel stream from said refinery to generate heat for said thermal oxidizing step.

12. The process of claim 11 wherein said fuel stream is taken from a pressure swing adsorption tail gas and/or from an off-gas stream from a fractionation column in a hydroprocessing unit.

13. The process of claim 1 further comprising reducing the temperature of said sulfur oxide stream by heat exchange before it is reacted with said ammonia stream.

14. The process of claim 13 further comprising quenching said sulfur oxide stream with water from a sour water stripper.

15. The process of claim 1 further comprising reacting remnant NOx in a reacted flue gas stream from said reacting step with ammonia to produce molecular nitrogen.

16. The process of claim 1 further comprising feeding a third hydrogen sulfide stream to a sulfidation reaction in which ammonium bisulfite from said reacting step is sulfided with hydrogen sulfide from said third hydrogen sulfide stream to produce ammonium thiosulfate.

17. The process of claim 1 wherein said reacting step produces a product of ammonium sulfate and drying said product with an air stream and returning said air stream upstream of the reacting step.

18. The process of claim 17 further comprising returning said air stream to said thermal oxidizing step.

19. The process of claim 18 wherein said drying step includes a water separation step and further comprising spraying an oxidation agent into the water separation step to oxidize residual hydrogen sulfide.

20. A process for managing hydrogen sulfide in a refinery comprising:

stripping hydrogen sulfide from a sour water stream from said refinery to provide a hydrogen sulfide rich stream and a hydrogen sulfide lean stream comprising ammonia;

feeding said hydrogen sulfide rich stream to a sulfur recovery unit to produce sulfur and a sulfur compounds stream, wherein said hydrogen sulfide rich stream has less than 10 mol % ammonia;

thermally oxidizing said hydrogen sulfide stream to produce a sulfur oxide stream; and reacting said sulfur oxide stream with the hydrogen sulfide lean stream to produce a reacted flue gas stream.

21. The process of claim 20 further comprising stripping ammonia from said hydrogen sulfide lean stream to provide said ammonia stream.

22. The process of claim 21 further comprising reacting said sulfur oxide stream with ammonia in a first ammonia stream and reacting remnant NOx in said reacted flue gas stream with ammonia in a second ammonia stream to produce molecular nitrogen and either or both of said first ammonia stream and said second ammonia stream can be taken from said hydrogen sulfide lean stream.

23. The process of claim 20 further comprising feeding a second hydrogen sulfide stream from said refinery to a sulfur recovery unit to produce sulfur and a sulfur compounds stream; and thermally oxidizing said sulfur compounds stream with said hydrogen sulfide stream.

24. A process for producing fertilizer in a refinery comprising:

feeding a hydrogen sulfide stream from said refinery to a sulfur recovery unit to produce sulfur and a sulfur compounds stream, wherein said hydrogen sulfide stream has less than 10 mol % ammonia;

thermally oxidizing said sulfur compounds stream comprising carbon sulfides to produce a sulfur oxide stream; and reacting said sulfur oxide stream with an ammonia stream.

25. The process of claim 24 further comprising taking said hydrogen sulfide stream from a sour water stripper and/or an amine regeneration unit.

* * * * *